United States Patent
Bang et al.

(10) Patent No.: US 11,723,042 B2
(45) Date of Patent: Aug. 8, 2023

(54) METHOD AND APPARATUS FOR UPLINK DATA CHANNEL WITH DROPPING OPERATION IN WIRELESS COMMUNICATION SYSTEM

(71) Applicant: Samsung Electronics Co., Ltd., Suwon-si (KR)

(72) Inventors: Jonghyun Bang, Suwon-si (KR); Youngbum Kim, Suwon-si (KR); Sungjin Park, Suwon-si (KR); Jeongho Yeo, Suwon-si (KR); Jinyoung Oh, Suwon-si (KR); Jinkyu Kang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 17/225,933

(22) Filed: Apr. 8, 2021

(65) Prior Publication Data

US 2021/0329608 A1    Oct. 21, 2021

(30) Foreign Application Priority Data

Apr. 10, 2020 (KR) .................... 10-2020-0044206

(51) Int. Cl.
*H04W 72/23* (2023.01)
*H04W 72/1268* (2023.01)
(Continued)

(52) U.S. Cl.
CPC .......... *H04W 72/23* (2023.01); *H04L 5/0044* (2013.01); *H04L 5/0078* (2013.01);
(Continued)

(58) Field of Classification Search
CPC ............... H04W 72/042; H04W 72/10; H04W 72/1257; H04W 72/1268; H04W 72/1289;
(Continued)

(56) References Cited

U.S. PATENT DOCUMENTS

| 2020/0053749 A1 | 2/2020 | Liu et al. |
| 2020/0146064 A1 | 5/2020 | Oh et al. |

(Continued)

FOREIGN PATENT DOCUMENTS

| KR | 10-2020-0050849 A | 5/2020 |
| WO | 2019246285 A1 | 12/2019 |

OTHER PUBLICATIONS

International Search Report of the International Searching Authority in connection with International Application No. PCT/KR2021/004229 dated Jul. 13, 2021, 3 pages.
(Continued)

*Primary Examiner* — Joshua Kading

(57) ABSTRACT

The disclosure relates to a communication technique for convergence between an IoT technology and a 5G communication system for supporting higher data transmission rate beyond a 4G system, and a system thereof. The disclosure may be applied to intelligence services (e.g., smart homes, smart buildings, smart cities, smart cars or connected cars, healthcare, digital education, retail businesses, security and safety related services, etc.) based on a 5G communication system and an IoT related technology. In addition, the disclosure relates to a method and apparatus for transmitting or receiving an uplink data channel in a wireless communication system. Specifically, the disclosure relates to a method for transmitting or receiving an uplink data channel in an unlicensed band. More specifically, the disclosure proposes a method determining, based on an uplink data channel transmission method by which a terminal received
(Continued)

or configured by a base station, a channel access procedure scheme and uplink data channel transmission.

20 Claims, 17 Drawing Sheets

(51) Int. Cl.
*H04W 72/56* (2023.01)
*H04W 72/50* (2023.01)
*H04W 74/00* (2009.01)
*H04W 74/08* (2009.01)
*H04L 5/00* (2006.01)
*H04W 74/02* (2009.01)

(52) U.S. Cl.
CPC ....... *H04L 5/0092* (2013.01); *H04W 72/1268* (2013.01); *H04W 72/535* (2023.01); *H04W 72/56* (2023.01); *H04W 74/00* (2013.01); *H04W 74/02* (2013.01); *H04W 74/0808* (2013.01); *H04W 74/0875* (2013.01); *H04L 5/0007* (2013.01); *H04L 5/0055* (2013.01)

(58) Field of Classification Search
CPC ..... H04W 72/14; H04W 74/00; H04W 74/02; H04W 74/0808; H04W 74/0875; H04L 5/0044; H04L 5/0078; H04L 5/0092; H04L 5/0007; H04L 5/0055; H04L 5/0094; H04L 5/0046; H04L 5/08; H04L 5/0082; H04L 5/0083; H04L 5/0085; H04L 5/0087; H04L 5/0089; H04L 27/2608; H04L 27/2646; H04L 27/2666
See application file for complete search history.

(56) References Cited

U.S. PATENT DOCUMENTS

| | | | |
|---|---|---|---|
| 2021/0007129 A1* | 1/2021 | Talarico | H04W 72/1268 |
| 2021/0266953 A1* | 8/2021 | Pelletier | H04W 72/1268 |
| 2022/0286973 A1* | 9/2022 | Takahashi | H04W 72/12 |

OTHER PUBLICATIONS

3GPP TS 38.214 V16.1.0 (Mar. 2020), Technical Specification, 3rd Generation Partnership Project, Technical Specification Group Radio Access Network, NR, Physical layer procedures for data (Release 16), 151 pages.
CATT, "Data/data prioritization", 3GPP TSG-RAN WG2 Meeting #107bis R2-1912211, Chongqing, P. R. China, Oct. 14-18, 2019, 5 pages.
Intel Corporation, "Enhancements to configured grants for NR-unlicensed", 3GPP TSG RAN WG1 Meeting #98 R1-1908627, Prague, Czechia, Aug. 26-30, 2019, 11 pages.
3GPP TS 38.212 V16.1.0 (Mar. 2020), Technical Specification, 3rd Generation Partnership Project; Technical Specification Group Radio Access Network; NR; Multiplexing and channel coding (Release 16), 146 pages.

* cited by examiner

METHOD AND APPARATUS FOR UPLINK DATA CHANNEL WITH DROPPING OPERATION IN WIRELESS COMMUNICATION SYSTEM

CROSS-REFERENCE TO RELATED APPLICATION

This application is based on and claims priority under 35 U.S.C. 119 to Korean Patent Application No. 10-2020-0044206, filed on Apr. 10, 2020, in the Korean Intellectual Property Office, the disclosure of which is herein incorporated by reference in its entirety.

BACKGROUND

1. Field

The disclosure relates to a wireless communication system and, specifically, to a method and apparatus for transmitting or receiving a data channel in a wireless communication system. More specifically, the disclosure relates a method for determining uplink signal transmission and a channel access procedure scheme in a wireless communication system, especially, in a node and system for transmitting an uplink signal via an unlicensed band.

2. Description of Related Art

To meet the demand for wireless data traffic having explosively increased due to commercialization of 4th-generation (4G) communication systems and an increase of multimedia services, efforts have been made to develop an improved 5th-generation (5G) or pre-5G communication system. Therefore, the 5G or pre-5G communication system is also called a "Beyond 4G Network communication system" or a "Post Long Term Evolution (LTE) System".

The 5G communication system is considered to be implemented in higher frequency (mmWave) bands (for example, 60 GHz bands) so as to increase data rates. To decrease propagation loss of the radio waves and increase the transmission distance in the ultra-high frequency band, beamforming, massive multiple-input multiple-output (MIMO), Full Dimensional MIMO (FD-MIMO), array antenna, analog beam forming, and large scale antenna techniques are discussed in 5G communication system.

In addition, in the 5G communication system, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid frequency-shift keying (FSK) and quadrature amplitude modulation (QAM) (FQAM) and sliding window superposition coding (SWSC) as advanced coding modulation (ACM) schemes, and filter bank multi carrier (FBMC), non-orthogonal multiple access (NOMA), and sparse code multiple access (SCMA) as advanced access technologies have been developed.

The Internet, which is a human-centered connectivity network where humans generate and consume information, is now evolving to the Internet of Things (IoT) where distributed entities, such as things, exchange and process information. The Internet of Everything (IoE), which is a combination of the IoT technology and the Big Data processing technology through connection with a cloud server and the like, has emerged. As technology elements, such as sensing technology, wired/wireless communication and network infrastructure, service interface technology, and security technology, have been demanded for IoT implementation, a sensor network, a machine-to-machine (M2M) communication, machine-type communication (MTC), and the like have been recently researched. Such an IoT environment may provide intelligent Internet technology services that create a new value for human life by collecting and analyzing data generated among connected things. IoT may be applied to a variety of fields including smart homes, smart buildings, smart cities, smart cars or connected cars, smart grids, healthcare, smart appliances and advanced medical services through convergence and combination between the existing information technology (IT) and various industrial applications.

Accordingly, various attempts have been made to apply 5G communication systems to IoT networks. For example, technologies such as a sensor network, machine-type communication (MTC), and machine-to-machine (M2M) communication may be implemented by beamforming, MIMO, array antennas, and the like. Application of a cloud radio access network (RAN) as the above-described Big Data processing technology may also be considered as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

The disclosure relates to a method and apparatus for determining data channel transmission or reception in a wireless communication system. In an embodiment of the disclosure, a scheme of performing a channel access procedure in a system and a node for transmitting an uplink signal via an unlicensed band, and a method of performing and determining uplink signal transmission are suggested.

In accordance with an aspect of the disclosure, a method performed by a terminal is provided. The method includes receiving, from a base station, configuration information indicating a resource for one or more first physical uplink shared channel (PUSCH); receiving, from the base station, downlink control information indicating a resource for a second PUSCH, wherein the resource for the second PUSCH is after the resource for the one or more first PUSCH, dropping a transmission of at least part of the one or more first PUSCH; and transmitting the second PUSCH to the base station.

In accordance with another aspect of the disclosure, a method performed by a base station is provided. The method includes transmitting, to a terminal, configuration information indicating a resource for one or more first physical uplink shared channel (PUSCH); transmitting, to the terminal, downlink control information indicating a resource for a second PUSCH, wherein the resource for the second PUSCH is after the resource for the one or more first PUSCH resource, receiving the second PUSCH from the terminal, wherein a transmission of at least part of the one or more first PUSCH is dropped by the terminal.

In accordance with another aspect of the disclosure, a terminal is provided. The terminal includes a transceiver; and a controller configured to: receive, from a base station, configuration information indicating a resource for one or more first physical uplink shared channel (PUSCH); receive, from the base station, downlink control information indicating a resource for a second PUSCH, wherein the resource for the second PUSCH is after the resource for the one or more first PUSCH, drop a transmission of at least part of the one or more first PUSCH; and transmit the second PUSCH to the base station.

In accordance with another aspect of the disclosure, a base station is provided. The base station includes a transceiver; and a controller configured to: transmit, to a terminal, configuration information indicating a resource for one or more first physical uplink shared channel (PUSCH); transmit, to the terminal, downlink control information indicating a resource for a second PUSCH, wherein the resource for the second PUSCH is after the resource for the one or more first PUSCH resource, receive the second PUSCH from the terminal, wherein a transmission of at least part of the one or more first PUSCH is dropped by the terminal.

According to an embodiment of the disclosure, a method of determining control information included in a downlink control channel by a system or a node for receiving a downlink signal or by a system or a node for transmitting an uplink signal in a wireless communications system can enhance the efficiency of an uplink data transmission rate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
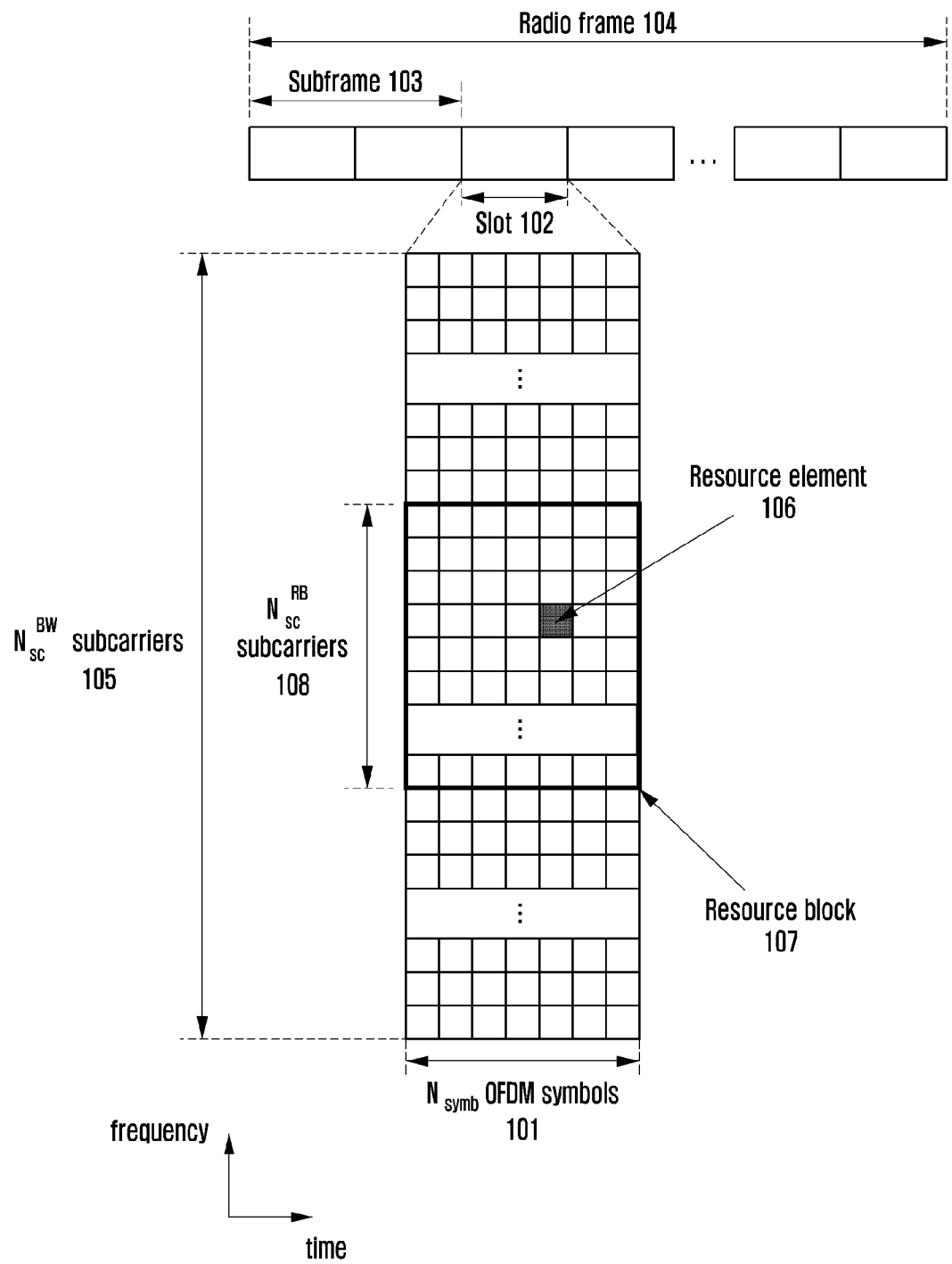
FIG. 1 illustrates an uplink/downlink time-frequency area transmission structure in an NR system according to an embodiment of disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. When it is determined that a detailed description of known functions or configurations related to the disclosure may obscure the gist of the disclosure, the detailed description thereof will be omitted. Further, the following terminologies are defined in consideration of the functions in the disclosure and may be construed in different ways by the intention or practice of users and operators. Therefore, the definitions thereof should be construed based on the contents throughout the specification.

Various advantages and features of the disclosure and methods accomplishing the same will become apparent from the following detailed description of embodiments with reference to the accompanying drawings. However, the disclosure is not limited to the embodiments disclosed herein but may be implemented in various forms. The embodiments have made the disclosure complete and are provided so that those skilled in the art can easily understand the scope of the disclosure. Therefore, the disclosure will be defined by the scope of the appended claims. Like reference numerals throughout the description denote like elements.

Hereinafter, embodiments of the disclosure will be described in detail with reference to the accompanying drawings.

In describing the embodiments of the disclosure, a description of technical contents which are well known in the art to which the disclosure belongs and are not directly connected to the disclosure will be omitted. Unnecessary decryptions will be omitted in order to provide the gist of the disclosure more clearly without obscuring the same.

For the same reason, some components are exaggerated, omitted, or schematically illustrated in the accompanying drawings. Further, the size of each component does not exactly reflect the real size. In each drawing, the same or corresponding components are denoted by the same reference numerals.

Various advantages and features of the disclosure and methods accomplishing the same will become apparent from the following detailed description of embodiments with reference to the accompanying drawings. However, the disclosure is not limited to the embodiments disclosed herein but may be implemented in various forms. The embodiments have made the disclosure complete and are provided so that those skilled in the art can easily understand the scope of the disclosure. Therefore, the disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses generate a means for performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including an instruction means for performing the functions described in block(s) of the flow charts. Since the computer program instructions may also be mounted on the computer or the other programmable data processing apparatuses, the instructions for performing a series of operation steps on the computer or the other programmable data processing apparatuses to generate processes executed by the computer and to execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term "-unit" used in the embodiment means software or hardware components such as Field Programmable Gate Array (FPGA) and Application Specific Integrated Circuit (ASIC), and the "-unit" performs predetermined roles. However, the meaning of the "-unit" is not limited to software or hardware. The "-unit" may be configured to be in a storage medium that may be addressed and may also be configured to reproduce one or more processor. Accordingly, for example, the "-unit" includes components such as software components, object-oriented software components, class components, task components and processors, functions, attributes, procedures, subroutines, segments of program code, drivers, firmware, microcode, circuits, data, a database, data structures, tables, arrays, and variables. The functions provided in the components and the "-units" may be combined as a smaller number of components and the "-units" or may be further separated into additional components and "-units". In addition, the components and the "-units" may also be implemented to replicate one or more CPUs within a device or a security multimedia card. Further, in some embodiments, "-unit" may include one or more processors.

In the 5G system, a support for various services is considered compared to the existing 4G system. For example, the most representative services are an enhanced mobile broadband (eMBB) communication service, an ultra-reliable and low-latency communication (URLLC) service, a massive machine type communication (mMTC) service, an evolved multimedia broadcast/multicast service (eM-BMS), etc. Further, a system providing the URLLC service may be referred to as an URLLC system, a system providing the eMBB service may be referred to as an eMBB system, and the like. In addition, the terms "service" and "system" may be interchangeably used with each other.

As described above, in a communication system, a plurality of services may be provided to a user. In order to provide a plurality of such services to a user, there is a need for a method capable of providing each service suitable for characteristics within the same time interval and an apparatus using the same.

In a wireless communication system, for example, in an LTE system, an LTE-advanced (LTE-A) system or a 5G new radio (NR) system, a base station and a terminal may be configured such that the base station transmits downlink control information (DCI) to the terminal, the DCI including resource assignment information for transmission of a downlink signal to be transmitted via a physical downlink control channel (PDCCH), and thus the terminal receives at least one downlink signal of the DCI (for example, a channel-state information reference signal (CSI-RS)), a physical broadcast channel (PBCH), or a physical downlink shared channel (PDSCH). For example, the base station transmits, in a subframe n, DCI indicating, to the terminal, reception of the PDSCH in the subframe n via the PDCCH, and upon reception of the DCI, the terminal receives the PDSCH in the subframe according to the received DCI. In addition, in the LTE, LTE-A, or NR system, the base station and the terminal may be configured such that the base station transmits DCI including uplink resource assignment information to the terminal via the PDCCH, and thus the terminal transmits at least one uplink signal of uplink control information (UCI) (for example, a sounding reference signal (SRS), UCI, or a physical random access channel (PRACH)) or a physical uplink shared channel (PUSCH) to the base station. For example, the terminal having received, from the base station via the PDCCH, uplink transmission configuration information (or uplink DCI or UL grant) in a subframe n may perform uplink data channel transmission (hereinafter, referred to as "PUSCH transmission") according to a pre-defined time (for example, n+4), a time configured via a higher-layer signal (for example, n+k), or uplink signal transmission time indicator information included in the uplink transmission configuration information.

In a case where configured downlink transmission is transmitted from the base station to the terminal via an unlicensed band, or configured uplink transmission is transmitted from the terminal to the base station via the unlicensed band, a transmission device (the base station or the terminal) may perform a channel access procedure or listen-before talk (LBT) procedure on the unlicensed band where a signal transmission is configured before or immediately before a start of the configured signal transmission. According to a result of performing the channel access procedure, when it is determined that the unlicensed band is in an idle state, the transmission device may access the unlicensed band and then perform the configured signal transmission. According to the result of the channel access procedure performed by the transmission device, when it is determined that the unlicensed band is not in the idle state or that the unlicensed band is in an occupied state, the transmission device fails to access the unlicensed band and thus fails to perform the configured signal transmission. In general, in the channel access procedure via the unlicensed band where signal transmission is configured, the transmission device may determine the idle state of the unlicensed band by receiving a signal via the unlicensed band during a predetermined time or a time calculated according to a pre-defined rule (for example, a time calculated using a random value selected by the base station or the terminal), and comparing a strength of the received signal and a threshold value that is pre-defined or calculated by using a function of at least one parameter including a channel bandwidth, a bandwidth of a signal to be transmitted, the intensity of transmission power, or a beamwidth of a transmission signal. For example, when a strength of a signal received by the transmission device for 25 microseconds (μs) is less than −72 dBm, that is, a pre-defined threshold, the transmission device may determine that the unlicensed band is in the idle state and thus may perform the configured signal transmission. In this case, a maximum available time of the signal transmission may be limited according to a maximum channel occupancy time in the unlicensed band, which is defined according to each country or each region, or a type (for example, the base station, the terminal, a master device or a slave device) of the transmitting apparatus. For example, in Japan, the base station or the terminal in 5 GHz of the unlicensed band may perform the channel access procedure and then may transmit, during a maximum of 4 milliseconds (ms), a signal by occupying a channel without additionally performing the channel access procedure. When the strength of the signal received by for 25 μs is greater than −72 dBm, which is the pre-defined threshold, the base station may determine that the unlicensed band is not in the idle state and transmits no signal.

In the 5G communication system, in order to provide various services and support a high data transmission rate, various technologies such as a technology capable of performing re-transmission in units of code block groups and transmitting an uplink signal without UL scheduling information have been introduced. Accordingly, to perform 5G communication via the unlicensed band, a more efficient channel access procedure based on various parameters is required.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), and LTE-Advanced (LTE-A) of 3GPP, high-rate packet data (HRPD) and a ultra-mobile broadband (UMB) of 3GPP2, and 802.16e of IEEE. In addition, 5G or NR communication standards are being established for a 5G wireless communication system.

In a wireless communication system including the 5G system, at least one of services including eMBB, mMTC, and URLLC may be provided to the terminal. The services may be provided to a same terminal during a same time interval. In an embodiment, the eMBB may be a service aiming at high-speed transmission of large-capacity data, the mMTC may be a service aiming at minimizing terminal power and connecting multiple terminals, and the URLLC may be a service aiming at high reliability and low latency, but the disclosure is not limited thereto. The above three services may be major scenarios in a system such as an LTE system or a 5G or new-radio/next-radio (NR) system beyond LTE.

In a case where a base station has scheduled data corresponding to an eMBB service for a terminal in a particular transmission time interval (TTI), when the situation in which URLLC data is to be transmitted in the TTI occurs, the base station does not transmit some of eMBB data in a frequency band in which the eMBB data has already been scheduled and transmitted, but may transmit the generated URLLC data in the frequency band. A terminal for which the eMBB has been scheduled and a terminal for which URLLC has been scheduled may be the same terminal or different terminals. In such a case, the possibility that the eMBB data may be damaged increases because there is a portion in which some of the already scheduled and transmitted eMBB data are not transmitted. Accordingly, in the above case, there is a need for a method of processing a signal received by the terminal for which eMBB has been scheduled or the terminal for which URLLC has been scheduled and a method of receiving a signal.

Hereinafter, the disclosure is described in detail with reference to the accompanying drawings. When it is determined that a detailed description for the function or configuration related to the disclosure may obscure the gist of the disclosure, the detailed description therefor will be omitted. Further, in the description of the disclosure, the following terminologies are defined in consideration of the functions in the disclosure and may be construed in different ways by the intention or practice of users and operators.

Therefore, the definitions thereof should be construed based on the contents throughout the specification. Hereinafter, a base station is an entity that assigns resources of a terminal, and may be at least one of an eNode B, a Node B, a BS, a wireless access unit, a BS controller, or a node on a network. A terminal may include a user equipment (UE), a mobile station (MS), a cellular phone, a smartphone, a computer, or a multimedia system capable of performing a communication function. In the disclosure, a downlink (DL) means a radio transmission path of a signal transmitted from a base station to a terminal, and an uplink (UL) means a radio transmission path of a signal transmitted from a terminal to a base station. Furthermore, hereinafter, the LTE or LTE-A system is described as an example in the disclosure, but is not limited thereto, and embodiments of the disclosure may be applied to other communication systems having a similar technical background or channel type, and a 5th-generation mobile communication technology (5G or new-radio (NR)) developed beyond LTE-A can be included therein, for example. Furthermore, an embodiment of the disclosure may be applied to other communication systems through some modifications without greatly departing from the range of the disclosure based on a determination of those having skilled technical knowledge.

As a representative example of the broadband wireless communication systems, in an NR system, an orthogonal frequency-division multiplexing (OFDM) scheme has been adopted for a downlink (DL), and both the OFDM scheme and a single carrier frequency division multiple access (SC-FDMA) scheme have been adopted for an uplink (UL). The uplink indicates a radio link through which data or a control signal is transmitted from a terminal (a user equipment (UE) or a mobile station (MS)) to a base station (an eNode B or a BS), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

In a 5G system, flexibly defining and operating a frame structure may be required in consideration of various services and requirements. For example, services may have different subcarrier spacings according to the requirements. In a current 5G communication system, a scheme of supporting a plurality of subcarrier spacings may be determined by using [Equation 1] below.

$$\Delta f = f_0 2^m \qquad \text{[Equation 1]}$$

Here, $f_0$ indicates a default subcarrier spacing in a system, and m indicates a scaling factor that is an integer. For example, when $f_0$ is 15 kHz, a set of subcarrier spacings that the 5G communication system can have may include 3.75 kHz, 7.5 kHz, 15 kHz, 30 kHz, 60 kHz, 120 kHz, 240 kHz, 480 kHz, or the like. An available set of subcarrier spacings may vary according to a frequency band. For example, in a frequency band equal to or less than 6 GHz, 3.75 kHz, 7.5 kHz, 15 kHz, 30 kHz, and 60 kHz may be used, and in a frequency band equal to or greater than 6 GHz, 60 kHz, 120 kHz, and 240 kHz may be used.

The length of an OFDM symbol may vary depending on the subcarrier spacing constituting the OFDM symbol. This is because the subcarrier spacing and the OFDM symbol length are inversely proportional to each other, which is a characteristic feature of OFDM symbols. For example, when the subcarrier spacing doubles, the symbol length becomes half, and when the subcarrier spacing becomes half, the symbol length doubles.

The NR system adopts a hybrid automatic repeat request (HARQ) scheme such that, when decoding fails during the initial transmission, the corresponding data is retransmitted in the physical layer. According to the HARQ scheme, when a receiver fails to accurately decode data, the receiver transmits information indicating the decoding failure (negative acknowledgement (NACK)) to a transmitter such that the transmitter can retransmit the corresponding data in the physical layer. The receiver combines data retransmitted by the transmitter with data, which has previously failed to be decoded, thereby increasing the data receiving performance. In addition, when the receiver accurately decodes data, the receiver transmits information indicating the successful decoding (acknowledgement (ACK)) to the transmitter such that the transmitter can transmit new data.

FIG. 1 illustrates a basic structure of a time-frequency domain, which is a radio resource area in which a data or control channel is transmitted in up/downlink in an NR system or a system similar thereto according to an embodiment of the disclosure.

Referring to FIG. 1, a horizontal axis indicates a time domain, and a vertical axis indicates a frequency domain. A minimum transmission unit in the time domain is an OFDM symbol or DFT-s-OFDM symbol, and $N_{symb}$ OFDM symbols 101 gather to configure one slot 102. Here, the OFDM symbol represents a symbol used to transmit or receive a signal by using an OFDM multiplexing scheme, and the DFT-s-OFDM symbol represents a symbol used to transmit or receive a signal by using a DFT-s-OFDM multiplexing scheme or an SC-FDMA multiplexing scheme. Hereinafter, for convenience of description, the OFDM symbol and the DFT-s-OFDM symbol are not distinguished from each other and thus are collectively referred to as an OFDM symbol, and will now be described with reference to reception or transmission of a downlink signal, but may also be applied to reception or transmission of an uplink signal.

When spacing between subcarriers is 15 kHz, one slot constitutes one subframe 103, and lengths of the slot and the subframe may each be 1 ms. The number of the slots constituting one subframe 103, and a length of the slot may vary according to spacing between subcarriers. For example, when spacing between subcarriers is 30 kHz, four slots gather to constitute one subframe 103. In this case, a length of the slot is 0.5 ms, and a length of the subframe is 1 ms. A radio frame 104 may be a time domain period composed of 10 subframes. A minimum transmission unit in the frequency domain is a subcarrier, and a transmission bandwidth of a whole system is composed of $N_{BW}$ subcarriers 105. However, these specific numerical values may be variably applied. For example, in the LTE system, spacing between subcarriers is 15 kHz, two slots gather to constitute one subframe 103, and in this case, a length of the slot is 0.5 ms and a length of the subframe is 1 ms.

A basic unit of a resource in the time-frequency domain is a resource element (RE) 106 and may be expressed as a symbol index and a subcarrier index. A resource block (RB or a physical resource block (PRB)) 107 may be defined as $N_{symb}$ consecutive OFDM symbols 101 in the time domain and $N_{SC}^{RB}$ consecutive subcarriers 108 in the frequency domain. Therefore, one RB 107 in one slot may include $N_{symb} \times N_{SC}^{RB}$ number of REs. In general, a minimum data assignment unit in the frequency domain is the RB 107. In the NR system, $N_{symb}=14$ and $N_{SC}^{RB}=12$, and the number of RBs ($N_{RB}$) may change according to a bandwidth of a system transmission band. In the LTE system, generally, $N_{symb}=7$ and $N_{SC}^{RB}=12$, and $N_{RB}$ may change according to a bandwidth of a system transmission band.

Downlink control information may be transmitted within first N OFDM symbols in the subframe. Generally, N=11, 2, 31, and the number of symbols in which the downlink control information is transmittable via a higher-layer signal may be configured for the terminal by the base station. In addition, according to the amount of control information to be transmitted in a current slot, the base station may change, for each slot, the number of symbols in which downlink control information is transmittable in a slot, and may transfer information on the number of symbols to the terminal via a separate downlink control channel.

In the NR system, one component carrier (CC) or serving cell may include up to 250 RBs. Therefore, when a terminal always receives the entire serving cell bandwidth as in the LTE system, the power consumption of the terminal may be extreme. To solve this problem, a base station may configure one or more bandwidth parts (BWP) for the terminal, thus supporting the terminal in changing a reception area in the cell. In the NR system, the base station may configure an "initial BWP", which is the bandwidth of CORESET #0 (or a common search space (CSS)), for the terminal through a master information block (MIB). Subsequently, the base station may configure the initial BWP (the first BWP) for the terminal through radio resource control (RRC) signaling, and may report at least one piece of BWP configuration information that may be indicated through downlink control information (DCI) later. The base station may report a BWP ID through DCI, thereby indicating a band to be used by the terminal. When the terminal fails to receive the DCI in the currently allocated BWP for a specified time or longer, the terminal returns to a "default BWP" and attempts to receive the DCI.

Figure 2:
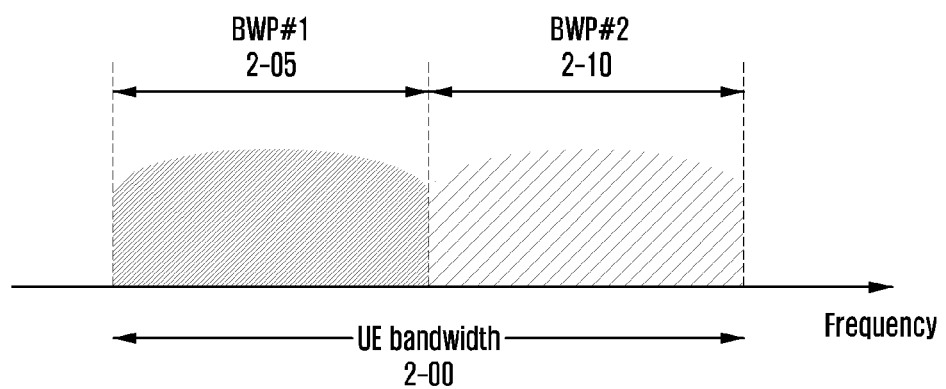
FIG. 2 illustrates an example of the configuration of a bandwidth part (BWP) in a wireless communication system according to an embodiment of the disclosure.

FIG. 2 illustrates an example of the configuration of a bandwidth part (BWP) in a wireless communication system according to an embodiment of the disclosure.

Referring to FIG. 2, FIG. 2 shows an example in which a terminal bandwidth 2-00 is configured with two bandwidth parts, that is, BWP #1 2-05 and BWP #2 2-10. A base station may configure one bandwidth part or a plurality of bandwidth parts for the terminal, and may configure, for each bandwidth part, information as shown in [Table 1].

TABLE 1

```
BWP ::=                                SEQUENCE
{
    bwp-Id
                       BWP-Id,
    (bandwidth part identifier)
    locationAndBandwidth   INTEGER (1..65536),
    (the location of the bandwidth part)
    subcarrierSpacing      ENUMERATED {n0,
n1, n2, n3, n4, n5},
    (subcarrier spacing)
    cyclicPrefix           ENUMERATED
{ extended }
    (cyclic prefix)
}
```

The disclosure is not limited to the above-described example, and not only the configuration information but also various parameters related to the bandwidth part may be configured for the terminal. The information may be transferred from the base station to the terminal through higher-layer signaling, for example, radio resource control (RRC) signaling. Among one or multiple configured bandwidth parts, at least one bandwidth part may be activated. Information indicating whether to activate the configured bandwidth part may be semi-statically transferred from the base station to the terminal through RRC signaling, or may be dynamically transferred through a MAC control element (CE) or DCI.

According to an embodiment, the terminal before the RRC connection may receive the configuration of an initial bandwidth part (initial BWP) for initial access from the base station through a master information block (MIB). More specifically, the terminal may receive configuration information relating to a control resource set (CORESET) and a search space in which a PDCCH can be transmitted in order to receive system information (remaining system information (RMSI) or system information block 1(SIB1)) required for initial access through the MIB in an initial access step. Each of the control resource set and the search space configured through the MIB may be considered as identity (ID) 0.

The base station may inform the terminal of configuration information such as frequency allocation information, time allocation information, and numerology for control resource set #0 through the MIB. Further, the base station may inform the terminal of configuration information relating to a monitoring period and occasion of control resource set #0, that is, configuration information relating to search space #0, through the MIB. The terminal may consider a frequency region configured as control resource set #0 acquired from the MIB as an initial bandwidth part for initial access. In this case, the ID of the initial bandwidth part may be considered as 0.

In relation to a method for configuring the bandwidth part, terminals before RRC-connected may receive configuration information of an initial bandwidth part through a master information block (MIB). More specifically, a control resource set (CORESET) for a downlink control channel through which downlink control information (DCI) for scheduling a system information block (SIB) can be transmitted may be configured for the terminal through an MIB of a physical broadcast channel (PBCH). The bandwidth of the control resource set configured by the MIB may be considered as an initial bandwidth part, and the terminal may receive a PDSCH through which the SIB is transmitted, through the configured initial bandwidth part. An initial bandwidth part may be used for other system information (OSI), paging, and random access in addition to the reception of the SIB.

In the following description, a synchronization signal (SS)/PBCH block in a next-generation mobile communication system (a 5G system or NR system) will be described.

An SS/PBCH block means a physical layer channel block including a primary SS (PSS), a secondary SS (SSS), and a PBCH. More specifically, the SS/PBCH block is defined below.

PSS: This indicates a signal serving as a reference for downlink time/frequency synchronization and provides a part of information of a cell ID.

SSS: This is a reference for downlink time/frequency synchronization and provides the remaining cell ID information which a PSS does not provide. Additionally, the SSS may serve as a reference signal for demodulating a PBCH.

PBCH: This provides necessary system information required for transmitting or receiving a data channel and a control channel by a terminal. The necessary system information may include search space-related control information indicating wireless resource mapping information of a control channel, and scheduling control information of a separate data channel for transmitting system information.

SS/PBCH block: An SS/PBCH block includes a combination of a PSS, an SSS, and a PBCH. One SS/PBCH block or a plurality of SS/PBCH blocks may be transmitted within 5 ms, and each of transmitted SS/PBCH blocks may be distinguished from each other by an index.

The terminal may detect the PSS and the SSS and decode the PBCH in the initial access stage. An MIB may be obtained from the PBCH and control resource set #0 may be configured from the MIB. The terminal may monitor control resource set #0 under the assumption that a selected SS/PBCH block and a demodulation reference signal (DMRS) transmitted on control resource set #0 are in a quasi-co-location (QCL). The terminal may receive system information from downlink control information transmitted on control resource set #0. The terminal may obtain, from the received system information, configuration information related to a random access channel (RACH) required for initial access. The terminal may transmit a physical RACH (PRACH) to the base station in consideration of a selected SS/PBCH index, and the base station having received the PRACH may obtain information on the SS/PBCH block index selected by the terminal. The base station may monitor a block which the terminal selects from among SS/PBCH blocks, and control resource set #0 corresponding to (or associated with) the selected SS/PBCH block.

In the following description, downlink control information (hereinafter, referred to as "DCI") in a next-generation mobile communication system (a 5G system or an NR system) will be described in detail.

In the next-generation mobile communication system (the 5G system or the NR system), scheduling information on uplink data (or a physical uplink data channel (a physical uplink shared channel (PUSCH))) or downlink data (or a physical downlink data channel (a physical downlink shared channel, (PDSCH))) can be transferred through DCI from a base station to a terminal. The terminal may monitor a fallback DCI format and a non-fallback DCI format for a PUSCH or a PDSCH. The fallback DCI format may include a fixed field pre-defined between the base station and the terminal, and the non-fallback DCI format may include a configurable field.

The DCI may be subjected to a channel coding and modulation procedure, and then transmitted through a physical downlink control channel (PDCCH). A cyclic redundancy check (CRC) may be attached to a DCI message payload, and the CRC may be scrambled by a radio network temporary identifier (RNTI) corresponding to the identity of the terminal. Different types of RNTIs can be used for scrambling the CRC, which is attached to the DCI message payload, according to the purpose of a DCI message, for example, UE-specific data transmission, a power control command, a random access response, or the like. That is, an RNTI is not explicitly transmitted, and may be included in a CRC calculation procedure so as to be transmitted. When a DCI message transmitted on a PDCCH is received, the terminal may identify a CRC by using an allocated RNTI. When a CRC identification result indicates matching of the RNTI, the terminal may identify that the message has been transmitted to the terminal.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying a slot format indicator (SFI) may be scrambled by an SFI-RNTI. DCI for notifying a transmission power control (TPC) may be scrambled by a TPC-RNTI. DCI for scheduling a UE-specific PDSCH or PUSCH may be scrambled by a cell RNTI (C-RNTI).

DCI format 0_0 may be used for fallback DCI for scheduling a PUSCH, and in this case, a CRC may be scrambled by a C-RNTI. In an embodiment, DCI format 0_0 having a CRC scrambled by a C-RNTI may include the following information as shown in [Table 2].

TABLE 2

- Identifier for DCI formats (DCI format identifier) - [1] bit
- Frequency domain resource assignment - [[$\log_2$ ($N_{RB}^{UL,BWP}$ ($N_{RB}^{UL,BWP}$ + 1)/2)] ] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- Uplink/supplementary uplink (UL/SUL) indicator - 0 or 1 bit DCI format 0_1 may be used for non-fallback DCI for scheduling a PUSCH, and in this case, a CRC may be scrambled by a C-RNTI. In an embodiment, DCI format 0_1 having a CRC scrambled by a C-RNTI may include the following information as shown in [Table 3].

TABLE 3

- Carrier indicator - 0 or 3 bits
- UL/SUL indicator - 0 or 1 bit
- Identifier for DCI formats - [1] bits
- Bandwidth part indicator - 0, 1, or 2 bits
- Frequency domain resource assignment
    • For resource allocation type 0, [$N_{RB}^{UL,BWP}$/P]bits
    • For resource allocation type 1, [$\log_2$ ($N_{RB}^{UL,BWP}$($N_{RB}^{UL,BWP}$ + 1)/2)] bits
- Time domain resource assignment -1, 2, 3, or 4 bits
- VRB-to-PRB mapping (mapping between virtual resource block and physical resource block) - 0 or 1 bit, only for resource allocation type 1.

TABLE 3-continued

- 0 bit if only resource allocation type 0 is configured;
- 1 bit otherwise.
- Frequency hopping flag - 0 or 1 bit, only for resource allocation type 1.
  - 0 bit if only resource allocation type 0 is configured;
  - 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  - 1 bit for semi-static HARQ-ACK codebook;
  - 2 bits for dynamic HARQ-ACK codebook with single HARQ-ACK codebook.
- 2nd downlink assignment index - 0 or 2 bits
  - 2 bits for dynamic HARQ-ACK codebook with two HARQ-ACK sub-codebooks;
  - 0 bit otherwise.
- TPC command for scheduled PUSCH - 2 bits
- SRS resource indicator - $\lceil \log_2 (\Sigma_{k=1}^{L_{max}} (N_{SRS_k}))\rceil$ or $\lceil \log_2 (N_{SRS})\rceil$ bits
  - $\lceil \log_2 (\Sigma_{k=1}^{L_{max}} (N_{SRS_k}))\rceil$ bits for non-codebook based PUSCH transmission(if PUSCH transmission is not based on codebook);
  - $\lceil \log_2 (N_{SRS})\rceil$ bits for codebook based PUSCH transmission(if PUSCH transmission is based on codebook).
- Precoding information and number of layers - up to 6 bits
- Antenna ports - up to 5 bits
- SRS request - 2 bits
- CSI request (wherein CSI indicates channel state information) - 0, 1, 2, 3, 4, 5, or 6 bits
- Code block group (CBG) transmission information - 0, 2, 4, 6, or 8 bits
- Phase tracking reference signal (PTRS)-Demodulation reference signal (DMRS) association - 0 or 2 bits.
  - beta_offset indicator - 0 or 2 bits
  - DMRS sequence initialization - 0 or 1 bit DCI format 1_0 may be used for fallback DCI for scheduling a PDSCH, and in this case, a CRC may be scrambled by a C-RNTI. In an embodiment, DCI format 1_0 having a CRC scrambled by a C-RNTI may include the following information as shown in [Table 4].

TABLE 4

- Identifier for DCI formats - [1] bit
- Frequency domain resource assignment - $\lceil \lceil \log_2 (N_{RB}^{DL,BWP}(N_{RB}^{DL,BWP} + 1)/2)\rceil \rceil$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits Alternatively, DCI format 1_0 may be used for DCI for scheduling a PDSCH relating to an RAR message, and in this case, a CRC may be scrambled by an RA-RNTI. In an embodiment, DCI format 1_0 having a CRC scrambled by an RA-RNTI may include the following information as shown in [Table 5].

TABLE 5

- Frequency domain resource assignment - $\lceil \lceil \log_2 (N_{RB}^{DL,BWP}(N_{RB}^{DL,BWP} + 1)/2)\rceil \rceil$ bits
- Time domain resource assignment - 4 bits
- VRB-to-PRB mapping - 1 bit
- Modulation and coding scheme - 5 bits
- TB scaling - 2 bits
- Reserved bits - 16 bits DCI format 1_1 may be used for non-fallback DCI for scheduling a PDSCH, and in this case, a CRC may be scrambled by a C-RNTI. In an embodiment, DCI format 1_1 having a CRC scrambled by a C-RNTI may include information as shown in [Table 6].

TABLE 6

Figure 3:
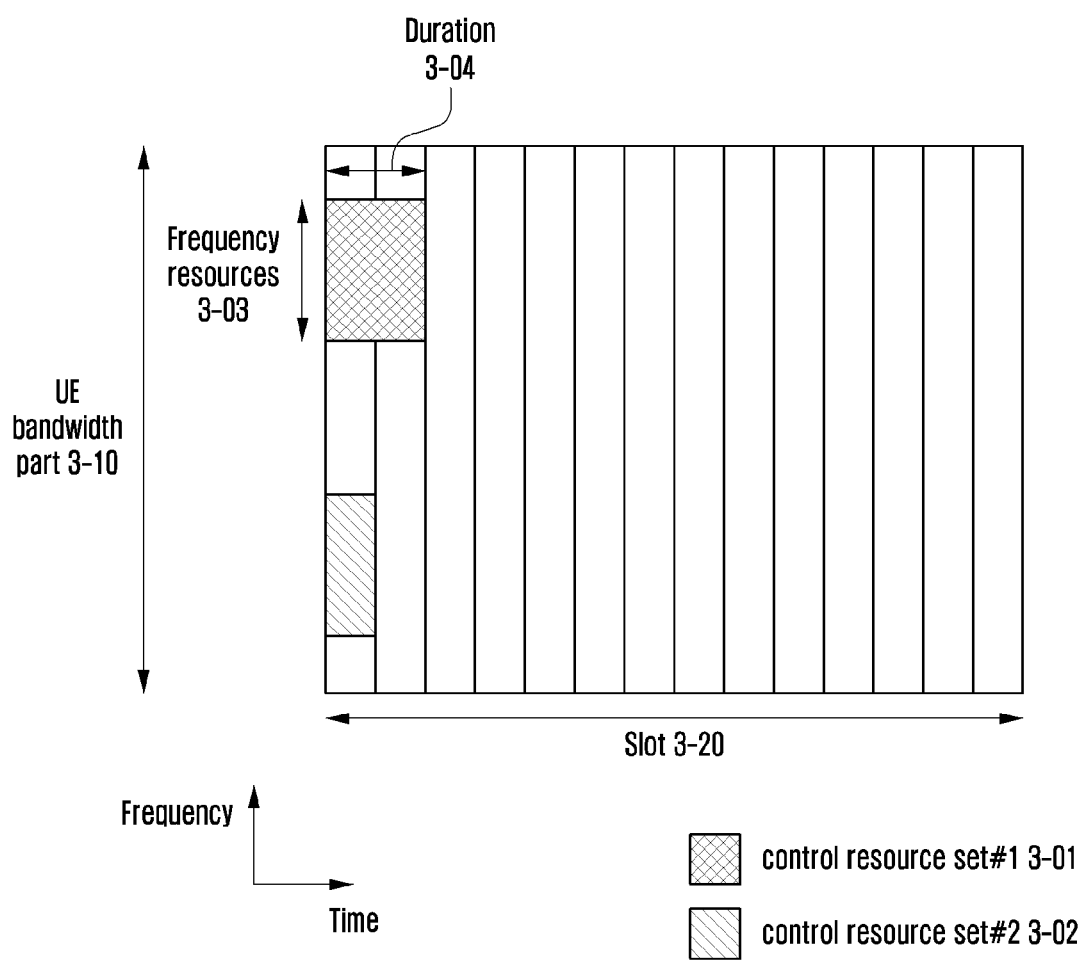
FIG. 3 illustrates an example of the configuration of a control resource set of a downlink control channel in a wireless communication system according to an embodiment of the disclosure.

- Carrier indicator - 0 or 3 bits
- Identifier for DCI formats - [1] bits
- Bandwidth part indicator - 0, 1, or 2 bits
- Frequency domain resource assignment
    • For resource allocation type 0, $\lceil N_{RB}^{DL,BWP}/P \rceil$ bits
    • For resource allocation type 1, $\lceil \log_2 (N_{RB}^{DL,BWP}(N_{RB}^{DL,BWP} + 1)/2) \rceil$ bits
- Time domain resource assignment -1, 2, 3, or 4 bits
- VRB-to-PRB mapping - 0 or 1 bit, only for resource allocation type 1.
    • 0 bit if only resource allocation type 0 is configured;
    • 1 bit otherwise.
- Physical resource block (PRB) bundling size indicator - 0 or 1 bit
- Rate matching indicator - 0, 1, or 2 bits
- Zero power channel state information-reference signal (ZP CSI-RS) trigger - 0, 1, or 2 bits For transport block 1:
- Modulation and coding scheme - 5 bits
- New data indicator - 1 bit
- Redundancy version - 2 bits For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5, or 6 bits
- Transmission configuration indication - 0 or 3 bits
- SRS request - 2 bits
- Code block group (CBG) transmission information - 0, 2, 4, 6, or 8 bits
- CBG flushing out information - 0 or 1 bit
- DMRS sequence initialization - 1 bit FIG. 3 illustrates an embodiment of a control resource set (CORESET), on which a downlink control channel is transmitted, in a 5G wireless communication system according to an embodiment of the disclosure.

Referring to FIG. 3, FIG. 3 shows an embodiment in which a terminal (UE) bandwidth part 3-10 is configured along a frequency axis, and two control resource sets (control resource set #1 3-01 and control resource set #2 3-02) are configured in one slot 3-20 along a time axis. The control resource sets 3-01 and 3-02 may be configured in a particular frequency resource 3-03 in the terminal bandwidth part 3-10 along the frequency axis. In the control resource sets 3-01 and 3-02, one OFDM symbol or multiple OFDM symbols may be configured along the time axis, and the configured OFDM symbol or symbols may be defined as a control resource set duration 3-04. Referring to FIG. 3, control resource set #1 3-01 may be configured to have a control resource set duration of two symbols, and control resource set #2 3-02 may be configured to have a control resource set duration of one symbol.

A control resource set in the above-described next-generation mobile communication system (the 5G system or the NR system) may be configured for a terminal by a base station via higher-layer signaling (for example, system information, master information block (MIB), and radio resource control (RRC) signaling). Configuring a control resource set for a terminal means providing information such as a control resource set identifier (identity), the frequency location of the control resource set, the symbol length of the control resource set, etc. For example, the configuration of the control resource set may include the following information as shown in [Table 7].

TABLE 7

```
ControlResourceSet ::=
    SEQUENCE {
    -- Corresponds to L1 parameter 'CORESET-ID'
    controlResourceSetId
    ControlResourceSetId,
        (control resource set identifier(Identity))
    frequencyDomainResources           BIT STRING (SIZE
(45)),
        (frequency-axis resource assignment information)
    duration                           INTEGER
(1..maxCoReSetDuration),
        (time-axis resource assignment information)
    cce-REG-MappingType
    CHOICE {
        (CCE-to-REG mapping scheme)
            interleaved
    SEQUENCE {
                                       reg-BundleSize
    ENUMERATED {n2, n3, n6},
            (REG bundle size)
                                       precoderGranularity
    ENUMERATED {sameAsREG-bundle, allContiguousRBs},
                                       interleaverSize
    ENUMERATED {n2, n3, n6}
                (interleaver size)
                shiftIndex
            INTEGER(0..maxNrofPhysicalResourceBlocks-1)
                (interleaver shift)
    },
    nonInterleaved                     NULL
```

TABLE 7-continued

```
},
    tci-StatesPDCCH
        SEQUENCE(SIZE (1..maxNrofTCI-StatesPDCCH)) OF TCI-StateId
                    OPTIONAL,
            (QCL configuration information)
    tci-PresentInDCI
        ENUMERATED {enabled}
}
```

The tci-StatesPDCCH (hereinafter, referred to as a "TCI state") configuration information shown in [Table 7] may include information on the index or indices of one synchronization signal (SS)/physical broadcast channel (PBCH) block or multiple SS/PBCH blocks which are in a quasi-co-located (QCL) relationship with a demodulation reference signal (DMRS) transmitted on a corresponding control resource set, or information on the index of a channel state information reference signal (CSI-RS). The frequencyDomainResources configuration information configures a frequency resource of the corresponding CORESET as a bitmap, wherein each bit indicates a group of non-overlapping six PRBs. The first group means a group of six PRBs having the first PRB index of $6 \cdot [N_{BWP}^{start}/6]$, wherein $N_{BWP}^{start}$ indicates a start point of a BWP. The most significant bit of the bitmap indicates the first group and the bits are configured in an ascending order.

In the wireless communication system, different antenna ports (which can be replaced with one or more channels, signals, or a combination thereof, but is collectively referred to as "different antenna ports" for convenience of further description in the disclosure) may be associated with each other according to QCL configuration as shown in [Table 8] below.

TABLE 8

```
QCL-Info ::=            SEQUENCE
    cell                ServCellIndex (an index of a serving
cell in which QCL reference RS is transmitted)
    bwp-ID              BWP-Id (an index of a bandwidth part
in which QCL reference RS is transmitted)
    referenceSignal     CHOICE { (an indicator indicating one of CSI-
RS and SS/PBCH as a QCL reference RS)
            csi-rs      NZP-CSI-RS-ResourceId,
        s    sb         SSB-Index
        },
        qcl-Type        ENUMERATED {typeA, typeB,
typeC, type D}, (QCL type indicator)
        ...
}
```

Specifically, in QCL configuration, two different antenna ports can be associated with each other based on relationships between a (QCL) target antenna port and a (QCL) reference antenna port. The terminal may apply (or assume) all or some of channel statistical characteristics measured by the reference antenna port (for example, a large-scale parameter of a channel, such as a Doppler shift, a Doppler spread, an average delay, a delay spread, an average gain, a spatial Rx (or Tx) parameter, a reception space filter parameter of the terminal, or a transmission space filter parameter of the terminal) at the time of target antenna port reception. In the description above, the target antenna means an antenna port for transmitting a channel or a signal configured by higher-layer configuration including the QCL configuration, or an antenna port for transmitting a channel or a signal for transmitting a channel or a signal to which a TCI state indicating the QCL configuration is applied. The reference antenna port means an antenna port for transmitting a channel or a signal indicated (or specified) by a referenceSignal parameter in the QCL configuration.

Specially, channel statistical characteristics specified by the QCL configuration (or indicated by the parameter qcl-Type in the QCL configuration) may be classified as below according to a QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In this case, the QCL type is not limited to the four types above, but all possible combinations are not enumerated in order not to obscure the gist of the description. QCL-TypeA corresponds to a QCL type used in a case where the bandwidth and the transport interval of the target antenna port are more sufficient than those of the reference antenna port (that is, in a case where the number of samples and the transmission bandwidth/time of the target antenna port are greater than the number of samples and the transmission bandwidth/time of the reference antenna port in both the frequency axis and the time axis), and thus all statistical characteristics measurable in the frequency axis and the time axis can be referred to. QCL-TypeB corresponds to a QCL type used in a case where the bandwidth of the target antenna port is sufficient to measure statistical characteristics, that is, the Doppler shift and Doppler spread parameters, measurable in the frequency. QCL-TypeC corresponds to a QCL type used in a case where the bandwidth and the transport interval of the target antenna port are insufficient to measure second-order statistics, that is, the Doppler spread and delay spread parameters, and thus only first-order statistics, that is, only the Doppler shift and average delay parameters, can be referred to. QCL-TypeD corresponds to a QCL type configured when spatial reception filter values used at the time of reference antenna port reception can be used at the time of target antenna port reception.

The base station may configure or indicate the maximum two QCL configurations for or to the target antenna port through TCI state configuration as shown in [Table 9a] below.

TABLE 9a

```
TCI-State ::=           SEQUENCE {
    tci-StateId         TCI-StateId, (TCI state indicator)
    qcl-Type1           QCL-Info, (the first QCL configuration
for the target antenna port to which the corresponding TCI state is applied)
    qcl-Type2           QCL-Info (the second QCL
configuration for the target antenna port to which the corresponding TCI state is applied)
                        -OPTIONAL,  --Need R
    ...
}
```

The first QCL configuration among two QCL configurations included in one TCI state configuration may be configured to be one of QCL-TypeA, QCL-TypeB, and QCL-TypeC. In this case, the configurable QCL type is specified by the types of the target antenna port and the reference antenna port and will be described in detail below. In addition, the second QCL configuration among two QCL configurations included in the TCI state configuration may be configured to be QCL-TypeD and can be omitted in some cases.

Tables 9ba to 9be show valid TCI state configurations according to the type of the target antenna port.

Table 9ba shows valid TCI state configurations in a case where the target antenna port is a CSI-RS for tracking (TRS). The TRS means an NZP CSI-RS, for which no repetition parameter is configured and trs-Info is configured to have a value of "true", among CSI-RSs. In Table 9ba, when configuration 3 is configured, the target antenna port can be used for an aperiodic TRS.

TABLE 9ba

Valid TCI state configurations when target antenna port is CSI-RS for tracking (TRS)

| Valid TCI state configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 9bb shows valid TCI state configurations in a case where the target antenna port is a CSI-RS for CSI. The CSI-RS means an NZP CSI-RS, for which neither repetition parameter is configured nor trs-Info is configured to have a value of "true", among CSI-RSs.

TABLE 9bb

Valid TCI state configurations when target antenna port is CSI-RS for CSI

| Valid TCI state configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 9bc shows valid TCI state configurations in a case where the target antenna port is a CSI-RS for beam management (BM) (that is identical to a CSI-RS for L1 RSRP reporting). The CSI-RS of BM means an NZP CSI-RS for which a repetition parameter is configured and has a value of "on" or "off" and no trs-info is configured to have a value of "true", among CSI-RSs.

TABLE 9bc

Valid TCI state configurations when target antenna port is CSI-RS for BM (for L1 RSRP reporting)

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 9bd shows valid TCI state configurations when the target antenna port is a PDCCH DMRS.

TABLE 9bd

Valid TCI state configurations when target antenna port is PDCCH DMRS

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9be shows valid TCI state configurations when the target antenna port is a PDSCH DMRS.

TABLE 9be

Valid TCI state configurations when target antenna port is PDSCH DMRS

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration scheme according to Tables 9ba to 9be, the target antenna port and the reference antenna port at each stage are configured and managed such as "SSB"→"TRS"→"CSI-RS for CSI, CSI-RS for BM, PDCCH DMRS, or PDSCH DMRS". Accordingly, the statistical characteristics measurable from the SSB and the TRS are associated with the antenna ports, and thus a reception operation by the terminal can be assisted.

Figure 4:
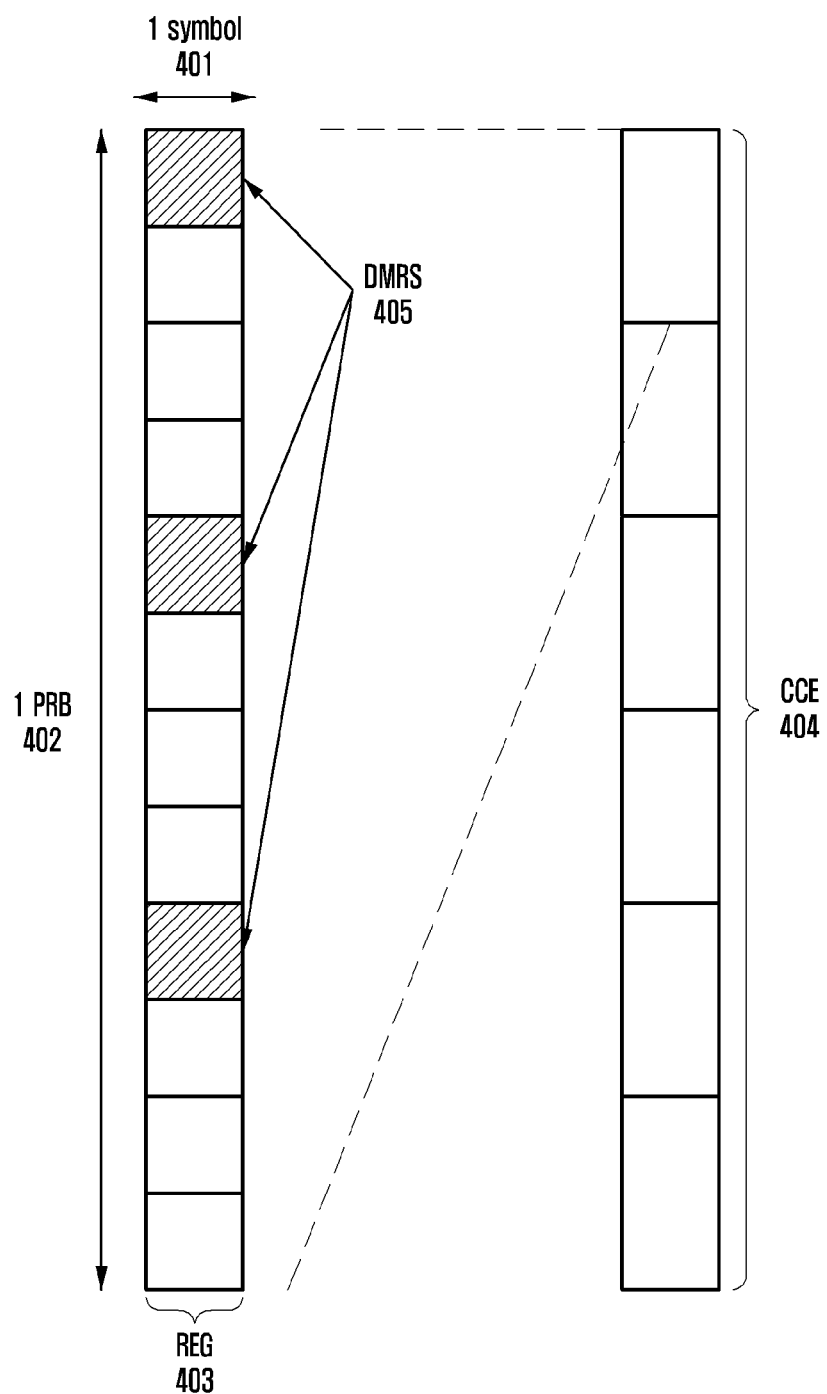
FIG. 4 illustrates a structure of a downlink control channel in an NR system according to an embodiment of the disclosure.

FIG. 4 illustrates a structure of a downlink control channel in a wireless communication system according to an embodiment of the disclosure. That is, FIG. 4 illustrates an example of a basic unit of a time and a frequency resource included in a downlink control channel which can be used by 5G according to an embodiment of the disclosure.

Referring to FIG. 4, the basic unit of a time and a frequency resource included in the control channel may be defined by a resource element group (REG) 403. The REG 403 may be defined as one OFDM symbol 401 on the time axis and one physical resource block (PRB) 402 on the frequency axis, that is, as 12 subcarriers. It is possible to configure a downlink control channel allocation unit by concatenating the REG 403.

As illustrated in FIG. 4, when the basic unit in which the downlink control channel is allocated in the 5G system is a control channel element (CCE) 404, one CCE 404 may include a plurality of REGs 403. For example, the REG 403 in FIG. 4 may include 12 REs, and when one CCE 404 includes six REGs 403, one CCE 404 may include 72 REs. When a downlink control resource set is configured, the corresponding resource set may include a plurality of CCEs 404, and a particular downlink control channel may be mapped to one or a plurality of CCEs 404 according to an aggregation level (AL) within the control resource set and may then be transmitted. The CCEs 404 within the control resource set may be distinguished by numbers, and the numbers of the CCEs 404 may be assigned according to a logical mapping scheme.

The basic unit of the downlink control channel illustrated in FIG. 4, that is, the REG 403, may include all REs to which the DCI is mapped and the region to which a DMRS 405, which is a reference signal for decoding the REs, is mapped. As illustrated in FIG. 4, three DMRSs 405 may be transmitted within one REG 403. The number of CCEs required to transmit the PDCCH may be 1, 2, 4, 8, or 16 according to the aggregation level (AL), and the different number of CCEs may be used to implement link adaptation of the downlink control channel. For example, when AL=L, one downlink control channel may be transmitted through L CCEs.

The terminal is required to detect a signal in the state in which the terminal is not aware of information on the downlink control channel, and a search space indicating a set of CCEs may be defined for blind decoding. The search space is a set of candidate control channels including CCEs for which the terminal should attempt decoding at the given aggregation level. There are several aggregation levels at which a set of CCEs is configured by 1, 2, 4, 8, and 16 CCEs, so that the terminal has a plurality of search spaces. The search space set may be defined as a set of search spaces at all configured aggregation levels.

The search spaces may be classified into a common search space and a terminal (UE)-specific search space. According to an embodiment of the disclosure, terminals in a predetermined group or all terminals may search for a common search space of the PDCCH in order to receive cell-common control information such as dynamic scheduling of system information or paging messages.

For example, the terminal may receive PDSCH scheduling allocation information for transmission of an SIB including information on the service provider of a cell by searching a common search space of the PDCCH. In a case of the common search space, terminals in a predetermined group or all terminals should receive the PDCCH, so that the common search space may be defined as a set of pre-arranged CCEs. Scheduling allocation information of the terminal-specific PDSCH or PUSCH may be received by searching a terminal-specific search space of the PDCCH. The terminal-specific search space may be defined in a terminal-specific manner as a terminal identity and a function of various system parameters.

In the 5G system, parameters for the PDCCH search space may be configured for the terminal by the base station via higher-layer signaling (for example, SIB, MIB, or RRC signaling). For example, the base station may configure, for the terminal, the number of PDCCH candidates at each aggregation level L, a monitoring period of the search space, a monitoring occasion in units of symbols within the slot for the search space, a search space type (a common search space or a terminal-specific search space), a combination of a DCI format and an RNTI to be monitored in the corresponding search space, a control resource set index for monitoring the search space, and the like. For example, the above-described configuration may include the following information as shown in [Table 10].

TABLE 10

```
SearchSpace ::=
    SEQUENCE {
    -- Identity of the search space. SearchSpaceId = 0 identifies the SearchSpace
configured via PBCH (MIB) or ServingCellConfigCommon.
        searchSpaceId
        SearchSpaceId,
            (search space identifier)
        controlResourceSetId
        ControlResourceSetId,
            (control resource set identifier)
        monitoringSlotPeriodicityAndOffset                CHOICE {
            (monitoring slot level period)
                sl1
                NULL,
                sl2
                INTEGER (0..1),
                sl4
                INTEGER (0..3),
                sl5
    INTEGER (0..4),
                sl8
                INTEGER (0..7),
                sl10
                INTEGER (0..9),
                sl16
                INTEGER (0..15),
                sl20
                INTEGER (0..19)
    }
    OPTIONAL,
        duration(monitoring duration)                     INTEGER (2..2559)
    monitoringSymbolsWithinSlot
    BIT STRING (SIZE (14))
                                                          OPTIONAL,
        (monitoring symbols in slot)
```

TABLE 10-continued

```
nrofCandidates
SEQUENCE {
    (the number of PDCCH candidate groups for each aggregation level)
        aggregationLevel1
ENUMERATED {n0, n1, n2, n3, n4, n5, n6, n8},
        aggregationLevel2
ENUMERATED {n0, n1, n2, n3, n4, n5, n6, n8},
        aggregationLevel4
ENUMERATED {n0, n1, n2, n3, n4, n5, n6, n8},
        aggregationLevel8
ENUMERATED {n0, n1, n2, n3, n4, n5, n6, n8},
        aggregationLevel16
ENUMERATED {n0, n1, n2, n3, n4, n5, n6, n8}
},
searchSpaceType                              CHOICE {
(search space type)
        -- Configures this search space as common search space (CSS) and DCI
formats to monitor.
        common
SEQUENCE {
(common search space)
}
        ue-Specific
SEQUENCE {
(UE-specific search space)
            -- Indicates whether the UE monitors in this USS for DCI
formats 0-0 and 1-0 or for formats 0-1 and 1-1.
        formats
        ENUMERATED {formats0-0-And-1-0, formats0-1-And-1-1},
        ...
    }
}
```

The base station may configure one or a plurality of search space sets for the terminal according to the configuration information. In an embodiment of the disclosure, the base station may configure search space set 1 and search space 2 for the terminal, and the configuration may be performed such that DCI format A scrambled by an X-RNTI in search space set 1 is monitored in the common search space and DCI format B scrambled by a Y-RNTI in search space set 2 is monitored in the terminal-specific search space.

According to the configuration information, there may be one or a plurality of search space sets in the common search space or the terminal-specific search space. For example, search space set #1 and search space set #2 may be configured as common search spaces, and search space set #3 and search space set #4 may be configured as terminal-specific search spaces.

The common search spaces may be classified into a particular type of search space sets according to the purpose thereof. RNTIs to be monitored may be different for each determined search space set type. For example, the common search space types, the purposes, and the RNTIs to be monitored may be classified as shown in Table 10a below.

TABLE 10a

| Search space type | Purpose | RNTI |
| --- | --- | --- |
| Type0 CSS | PDCCH transmission for SIB scheduling | SI-RNTI |
| Type0A CSS | PDCCH transmission for SI scheduling (SIB2, etc.) other than SIB1 | SI-RNTI |
| Type1 CSS | PDCCH transmission for random-access response (RAR) scheduling, Msg3 retransmission scheduling, and Msg4 scheduling | RA-RNTI, TC-RNTI |

TABLE 10a-continued

| Search space type | Purpose | RNTI |
| --- | --- | --- |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | PDCCH transmission for data scheduling in case of PCell | C-RNTI, MCS-C-RNTI, CS-RNTI |

In a common search space, the following combinations of a DCI format and a RNTI may be monitored, but is not limited to the examples below.
- DCI format 0_0/1_0 with CRC scrambled by C-RNTI, CS-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI In a terminal-specific search space, the following combinations of a DCI format and a RNTI may be monitored, but is not limited to the examples below.
- DCI format 0_0/1_0 with CRC scrambled by C-RNTI, CS-RNTI, TC-RNTI
- DCI format 1_0/1_1 with CRC scrambled by C-RNTI, CS-RNTI, TC-RNTI The described types of RNTIs may follow the definitions and purposes below.

Cell RNTI (C-RNTI): Terminal-specific PDSCH scheduling purpose

Temporary Cell RNTI (TC-RNTI): Terminal-specific PDSCH scheduling purpose

Configured Scheduling RNTI (CS-RNTI): Semi-statically configured terminal-specific PDSCH scheduling purpose Random Access RNTI (RA-RNTI): The purpose of scheduling a PDSCH in a random access stage Paging RNTI (P-RNTI): The purpose of scheduling a PDSCH on which paging is transmitted System Information RNTI (SI-RNTI): The purpose of scheduling a PDSCH on which system information is transmitted Interruption RNTI (INT-RNTI): The purpose of notifying of whether a PDSCH is punctured Transmit Power Control for PUSCH RNTI (TPC-PUSCH-RNTI): The purpose of indicating a power control command for a PUSCH Transmit Power Control for PUCCH RNTI (TPC-PUCCH-RNTI): The purpose of indicating a power control command for a PUCCH Transmit Power Control for SRS RNTI (TPC-SRS-RNTI): The purpose of indicating a power control command for an SRS In an embodiment, the described DCI formats may follow the definitions in [Table 11] below.

TABLE 11

| DCI Format | Usage |
| --- | --- |
| 0_0 | Scheduling of a PUSCH in one cell |
| 0_1 | Scheduling of a PUSCH in one cell |
| 1_0 | Scheduling of a PDSCH in one cell |
| 1_1 | Scheduling of a PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, a search space of aggregation level L in control resource set p and search space set s may be expressed as in the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 2]}$$

L: Aggregation level $n_{CI}$: Carrier index $N_{CCE,p}$: The total number of CCEs existing in control resource set p $n_{s,f}^\mu$: Slot index $M_{p,s,max}^{(L)}$: The number of PDCCH candidate groups of aggregation level L $m_{s,n_{CI}}$=0, . . . , $M_{p,s,max}^{(L)}$−1: The index of PDCCH candidate groups of aggregation level L i=0, . . . , L−1

$Y_{p,n_{s,f}^\mu} = (A_p \cdot Y_{p,n_{s,f}^\mu-1}) \bmod D, Y_{p,-1} = n_{RNTI} \neq 0, A_0 = 39827,$
$A_1 = 39829, A_2 = 39839, D = 65537$ $n_{RNTI}$: Terminal identifier In a case of a common search space, Y_(p,$n_{s,f}^\mu$) may be 0.

In a case of a terminal-specific search space, Y_(p,$n_{s,f}^\mu$) may be changed according to a time index and the identity (a C-RNTI or an ID configured for the terminal by the base station) of a terminal.

According to an embodiment of the disclosure, a plurality of search space sets may be configured as different parameters (for example, the parameters in [Table 10]) in the 5G system. Accordingly, the search space set that the terminal monitors may be different each time. For example, when search space set #1 is configured in an X-slot period, search space set #2 is configured in a Y-slot period, and X and Y are different from each other, the terminal may monitor both search space set #1 and search space set #2 in a particular slot, and may monitor only one of search space set #1 and search space set #2 in another particular slot.

Meanwhile, the uplink/downlink HARQ in the NR system adopts an asynchronous HARQ scheme in which the data retransmission time point is not fixed. By taking the downlink as an example, when a base station has received a feedback of HARQ NACK from the terminal in response to initially transmitted data, the base station freely determines the retransmission data transmission time point according to a scheduling operation. After buffering data that has been determined as an error as a result of decoding of reception data for an HARQ operation, the terminal may perform combining with the next retransmission data. HARQ ACK/NACK information of the PDSCH transmitted in a subframe n-k may be transmitted from the terminal to the base station via the PUCCH or the PUSCH in a subframe n. In the 5G communication system such as the NR system, a k value may be included in DCI for indicating or scheduling reception of the PDSCH transmitted in the subframe n-k and then transmitted, or may be configured for the terminal via a higher-layer signal. In this case, the base station may configure one or more k values via a higher-layer signal, and may indicate a particular k value via the DCI, wherein k may be determined based on HARQ-ACK processing capacity of the terminal, i.e., a minimum time required for the terminal to receive the PDSCH and then to generate and report HARQ-ACK with respect to the PDSCH. In addition, before the k value is configured for the terminal, the terminal may use a pre-defined value or a default value.

Next, the description of a resource area in which a data channel is transmitted in a 5G communication system will be made below.

Figure 5:
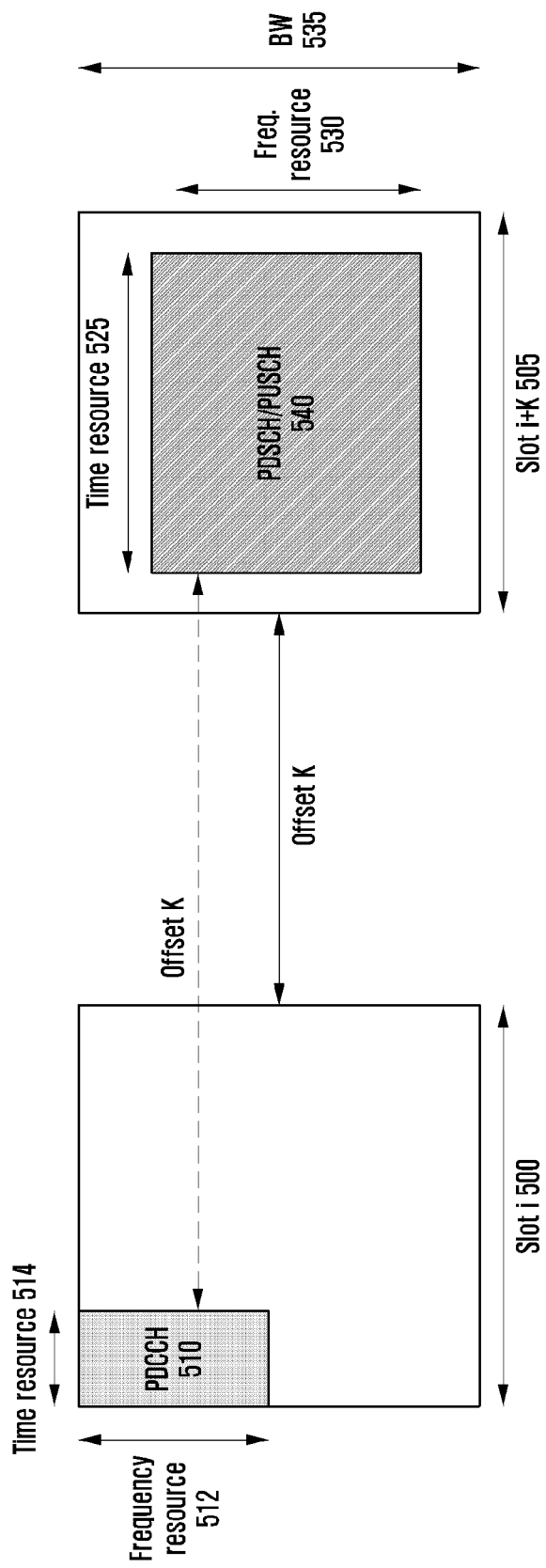
FIG. 5 illustrates a downlink or uplink scheduling method and a resource area in an NR system according to an embodiment of the disclosure.

FIG. 5 illustrates a resource area in which a data channel is transmitted in a 5G communication system. In a downlink control channel (hereinafter, referred to as a "PDCCH") area (hereinafter, referred to as a "control resource set (CORESET)" or a "search space (SS)") configured by the base station through a higher-layer signal, the terminal monitors or searches for a PDCCH 510. In this case, the downlink control channel area may include time-domain information 514 and frequency-domain information 512, the time-domain information 514 may be configured in units of symbols, and the frequency-domain information 512 may be configured in units of RBs or RB groups. When the terminal detects the PDCCH 510 in a slot i 500, the terminal acquires downlink control information (DCI) transmitted via the detected PDCCH 510. The terminal may acquire scheduling information relating to a downlink data channel or an uplink data channel from the received downlink control information (DCI). In other words, the DCI may include at least information on a resource area (or a PDSCH transmission area) in which the terminal is to receive a downlink data channel (hereinafter, referred to as a "PDSCH") transmitted from the base station, or information on a resource area that is allocated to the terminal, by the base station, for transmission of an uplink data channel (a PUSCH). The case in which uplink data channel (PUSCH) transmission is scheduled for the terminal will be described as follows. The terminal that received DCI may acquire, from the DCI, a slot index or offset information K relating to reception of the PUSCH, and may determine a PUSCH transmission slot index. For example, the terminal may determine that the terminal is scheduled to transmit the PUSCH in a slot i+K 505, based on the offset information K, with reference to the slot index I 500 in which the PDCCH 510 is received. In this case, the terminal may also determine the slot i+K 505 or a PUSCH start symbol or time in the slot i+K by using the received offset information K, with reference to the received CORESET in which the PDCCH 510 is received. In addition, the terminal may acquire, from the DCI, information relating to a PUSCH transmission time-frequency resource area 540 in a PUSCH transmission slot 505, wherein PUSCH transmission frequency resource area information 530 may be information in units of PRBs or PRB groups. The PUSCH transmission frequency resource area information 530 is an area included in an initial (uplink) bandwidth (BW) 535 or an initial (uplink) bandwidth part (BWP) 535 that is determined by or is configured for the terminal via an initial access procedure. When a BW or a BWP is configured for the terminal via a higher-layer signal, the PUSCH transmission frequency resource area information 530 may be an area included in the BW or the BWP that is configured via the higher-layer signal.

The PUSCH transmission time resource area information 525 may be information in units of symbols or symbol groups, or may be information indicating absolute time information. In this case, the PUSCH transmission time resource area information 525 may be expressed as a combination of a PUSCH transmission start time or symbol and a PUSCH length, and a PUSCH end time or symbol, and may be included in the DCI as a field or value. Here, the PUSCH transmission time resource area information 525 may be included in the DCI as a field or a value expressing each of the PUSCH transmission start time or symbol and the PUSCH length, and the PUSCH end time or symbol. The terminal may transmit the PUSCH in a PUSCH transmission resource area 540 determined based on the DCI.

The description of a frequency-domain resource allocation scheme for a data channel in the 5G communication system will be made below.

The 5G system supports three types of frequency-domain resource allocation schemes for a physical downlink shared channel (PDSCH) and a physical uplink shared channel (PUSCH), namely resource allocation type 0, resource allocation type 1, and resource allocation type 2.

Resource Allocation Type 0

RB allocation information may be notified of to the terminal in the form of a bitmap for a resource block group (RBG) by the base station. In this case, the RBG may include a set of consecutive virtual RBs (VRBs), and the RBG size P may be determined as a value configured with a high-layer parameter (rbg-Size) and a value of a bandwidth part size defined in the table below.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number $N_{RBG}$ of RBGs of bandwidth part i having the size of $N_{BWP,i}^{size}$ may be defined as below:

$$N_{RBG} = \lceil (N_{BWP,i}^{size} + (N_{BWP,i}^{start} \bmod P))/P \rceil, \text{ where}$$

the size of the first RBG is $RBG_0^{size} = P - N_{BWP,i}^{start} \bmod P$, the size of last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise, the size of all other RBGs is P.

Each bit of a bitmap having the size of $N_{RBG}$ bit may correspond to each of the RBGs. The RBGs may be indexed in the order of the ascending frequency, starting from the lowest frequency position of the bandwidth part. With respect to $N_{RBG}$ RBGs in the bandwidth part, RBG #0 to RBG #($N_{RBG}-1$) may be mapped to MSB to LSB of an RBG bitmap. When a particular bit value in the bitmap is 1, the terminal may determine that an RBG corresponding to the bit value is allocated, and when a particular bit value in the bitmap is 0, the terminal may determine that an RBG corresponding to the bit value is not allocated.

Resource Allocation Type 1

Start positions and lengths of consecutively allocated VRBs may be notified of to the terminal as RB allocation information by the base station. In this case, interleaving or non-interleaving of the consecutively allocated VRBs may be additionally applied. A resource allocation field of resource allocation type 1 may be configured with a resource indication value (RIV), wherein the RIV may include a start point $RB_{start}$ of a VRB and the lengths $L_{RBS}$ of consecutively allocated RBs. More specifically, the RIV in the bandwidth part of the size $N_{BWP}^{size}$ may be defined as follows:

if $(L_{RBS}-1) \leq \lfloor N_{BWP}^{size}/2 \rfloor$ then $$RIV = N_{BWP}^{size}(L_{RBs}-1) + RB_{start}$$

else $$RIV = N_{BWP}^{size}(N_{BWP}^{size} - L_{RBs} + 1) + (N_{BWP}^{size} - 1 - RB_{start})$$

where $L_{RBs} \geq 1$ and shall not exceed $N_{BWP}^{size} - RB_{start}$.

Resource Allocation Type 2

M interlace index sets may be notified of to the terminal as RB allocation information by the base station.

Interlace index $m \in \{0, 1, \ldots, M-1\}$ may be configured by common RBs $\{m, M+m, 2M+m, 3M+m, \ldots\}$, and M may be defined as shown in Table 13 below.

TABLE 13

| μ | M |
|---|---|
| 0 | 10 |
| 1 | 5 |

The relationships between the common RB $n_{CRB}^\mu$ and the RB $n_{IRB,m}^\mu \in \{0, 1, \ldots\}$ in the interlace m and the bandwidth part i may be defined as below:

$$n_{CRB}^\mu = M n_{IRB,m}^\mu + N_{BWP,i}^{start,\mu} + ((m - N_{BWP,i}^{start,\mu}) \bmod M)$$

where $N_{BWP,i}^{start,\mu}$ is the common resource block where the bandwidth part starts relative to common resource block 0. u is subcarrier spacing index When a subcarrier spacing is 15 kHz (u=0), m0+1 indices may be notified of to the terminal as the RB allocation information relating to the interlace set by the base station.

In addition, a resource allocation field may be configured by resource indication value (RIV). When the RIV is 0≤RIV<M(M+1)/2, l=0, 1, . . . L−1, the resource allocation field may be configured by start interlace m0 and the number of consecutive interlaces L (L≥1), and the value is as follows:

if $(L-1) \leq \lfloor M/2 \rfloor$ then $RIV = M(L-1) + m_0$ else $RIV = M(M-L+1) + (M-1-m_0)$ When the RIV is RIV≥M(M+1)/2, the RIV may be configured by values of start interlace index m0 and 1, and the value may be configured as shown in Table 14.

TABLE 14

| RIV − M(M + 1)/2 | m₀ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

When a subcarrier spacing is 30 kHz (u=1), the RB allocation information may be notified of to the terminal in the form of a bitmap indicating interlaces allocated to the terminal, by the base station. The bitmap size is M, and 1 bit of the bitmap corresponds to each interlace. With respect to the interlace bitmap order, interlace indices 0 to M−1 may be mapped to MSB to LSB.

In addition, with respect to 15 kHz and 30 kHz, a least significant bit (LSB) $Y = \lceil \log_2(N_{RB-set}^{BWP}(N_{RB-set}^{BWP}+1))/2 \rceil$ of an FDRA field may mean a set of consecutive RBs of the PUSCH scheduled by DCI format 0_1. Y bit may be configured by a resource indication value (RIVRBset). In $0 \leq RIV_{RBset} < N_{RB-set}^{BWP}(N_{RB-set}^{BWP}+1)/2$, l=0, 1, . . . $L_{RBset}$−1, RIVRBset may be determined by a start RB set RBset$_{START}$ and the number $L_{RBset}$ ($L_{RBset} \geq 1$)) of consecutive RB sets. RIVRBset may be defined as follows:

if $(L_{RBset}-1) \leq \lfloor N_{RB-set}^{BWP}/2 \rfloor$ then $RIV_{RBset} = N_{RB-set}^{BWP}(L_{RBset}-1) + RBset_{START}$ else $RIV_{RBset} = N_{RB-set}^{BWP}(N_{RB-set}^{BWP}-L_{RBset}+1) + (N_{RB-set}^{BWP}-1-RBset_{START})$ $N_{RB-set}^{BWP}$ means a number of RB sets included in the BWP, and may be determined by the number of guard gaps (or bands) in a carrier preconfigured or configured via higher-layer signaling.

Meanwhile, in the NR system, a preparation time for PUSCH transmission after the terminal is scheduled to transmit the PUSCH is defined. When the PUSCH first symbol including a DMRS is scheduled to the terminal by the base station after L2, the terminal may transmit the PUSCH, or may disregard scheduling DCI. Here, L2 means the first uplink symbol where CP starts after $T_{proc,2} = \max((N_2+d_{2,1})(2048+144) \cdot \kappa 2^{-\mu} \cdot T_C, d_{2,2})$ from the last symbol of the PDCCH including DCI for scheduling the PUSCH.

N2 may be defined as shown in Tables 15A and 15B. u is determined by a value having a greater Tproc,2, among uDL and uUL, wherein uDL and uUL mean a PDCCH subcarrier spacing and a PUSCH subcarrier spacing, respectively. In addition, $\kappa = T_s/T_c = 64$, $T_S = 1/(\Delta f_{ref} \cdot N_{f,ref})$, $T_c = 1/(\Delta f_{max}())$, $T_c = 1/(\Delta f_{max}())$, $N_f = 4096$, and $N_{f,ref} = 2048$.

If the first symbol of the PUSCH is configured by only a DM-RS, d2,1=0, else d2,1=1.

If the DCI instructs BWP switching, d2,2 means a BWP switching time, else d2,2=0.

TABLE 15a

| μ | PUSCH preparation time N₂ [symbols] |
|---|---|
| 0 | 10 |
| 1 | 12 |
| 2 | 23 |
| 3 | 36 |

TABLE 15b

| μ | PUSCH preparation time N₂ [symbols] |
|---|---|
| 0 | 5 |
| 1 | 5.5 |
| 2 | 11 for frequency range 1 |

Next, a scheme of configuring a beam to transmit control information and data to the terminal by the base station will be described. For convenience of description in the disclosure, a process of transmitting control information via a PDCCH may be represented in that a PDCCH is transmitted, and a process of transmitting data via a PDSCH may be represented in that a PDSCH is transmitted.

First, a beam configuration scheme will be described.

Figure 6:
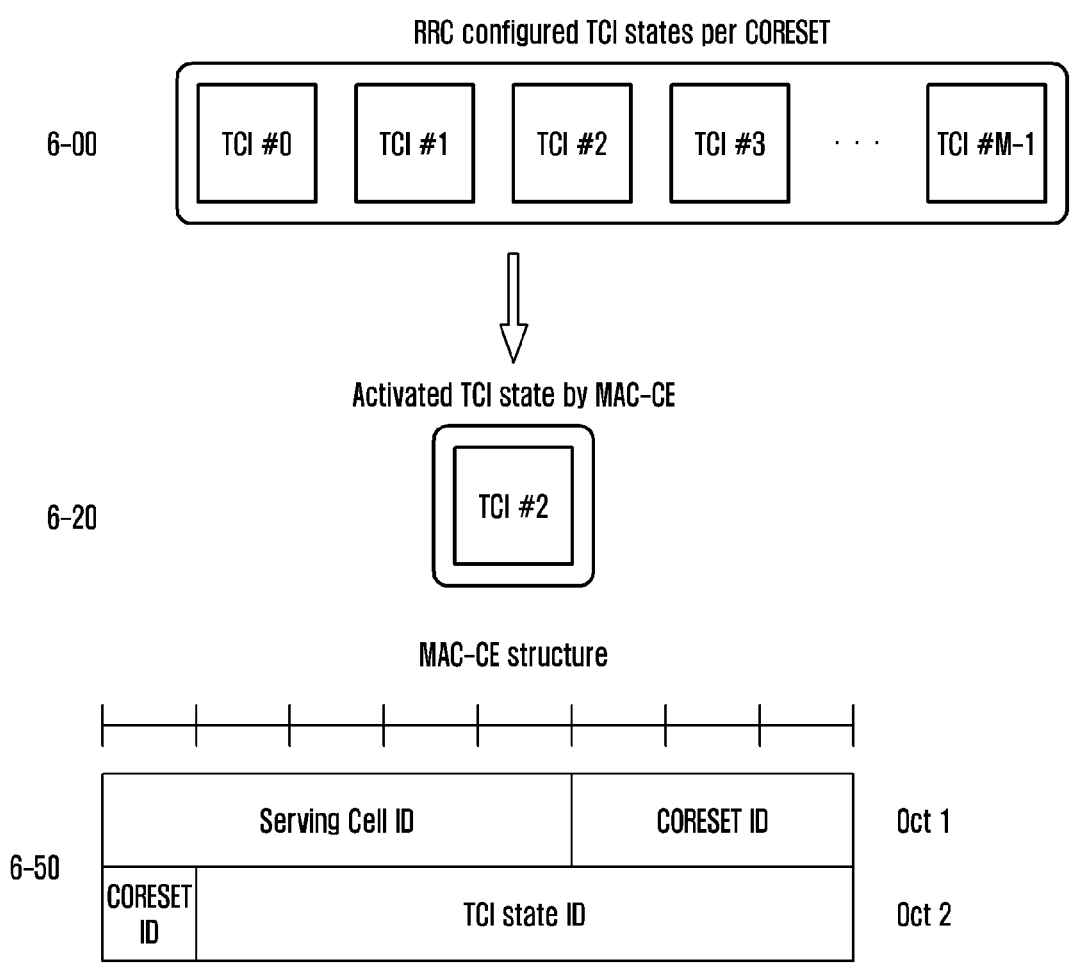
FIG. 6 illustrates a process of beam configuration and activation of a PDCCH according to an embodiment of the disclosure.

FIG. 6 illustrates a process of beam configuration and activation for a PDCCH according to an embodiment of the disclosure. First, a list of TCI states may be indicated for each CORESET through a higher-layer list such as RRC (operation 6-00). The list of TCI states may be indicated by "tci-StatesPDCCH-ToAddList" and/or "tci-StatesPDCCH-ToReleaseList". Next, one from the list of TCI states configured for each CORESET may be activated by the MAC-CE (operation 6-20). Operation 6-50 illustrates an example of a MAC-CE structure for TCI state activation. The meaning of each field and a value configured for each field in the MAC-CE are as follows.

Serving Cell Identifier (Serving Cell ID): This field indicates the identity of the Serving Cell for which the MAC CE applies. The length of the field is 5 bits;

CORESET Identifier (CORESET ID): This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

Transmssion control indication Identifier (TCI State ID): This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

Next, a scheme of configuring a beam for a PDSCH will be described.

Figure 7:
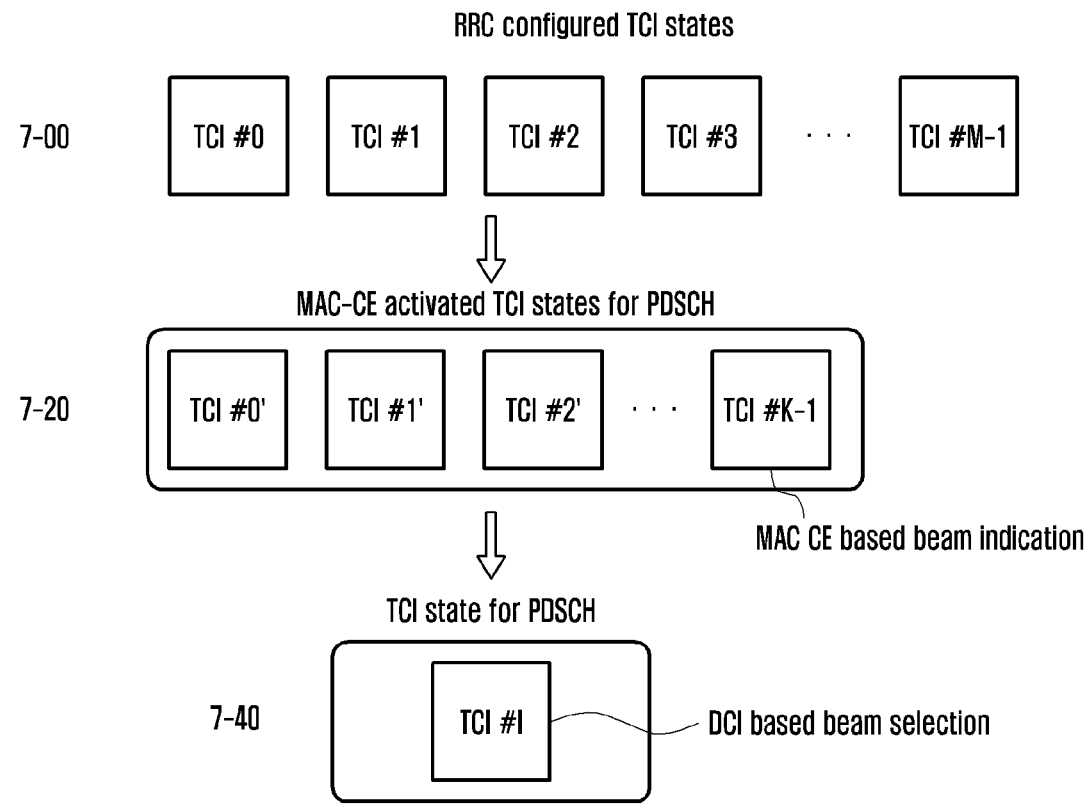
FIG. 7 illustrates a process of beam configuration and activation of a PDSCH according to an embodiment of the disclosure.
Figure 7:
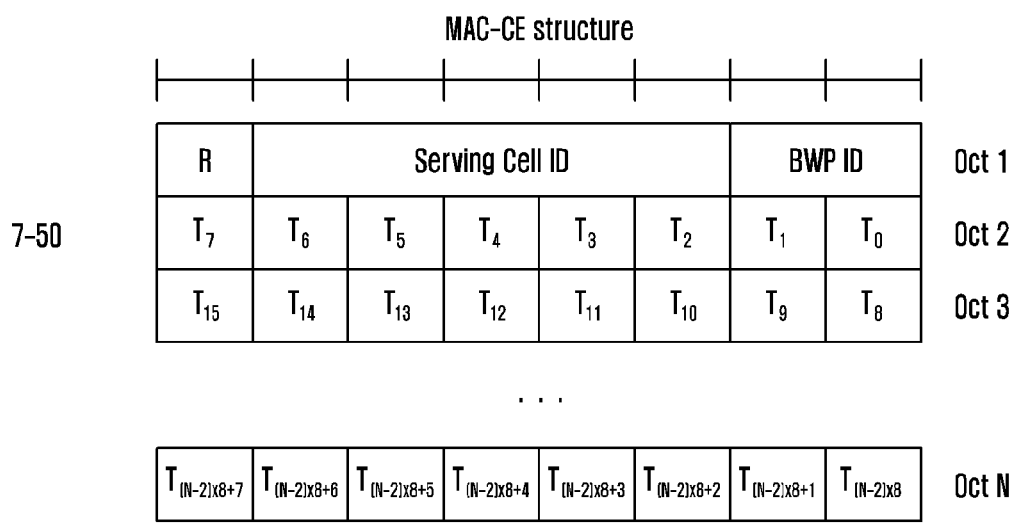

FIG. 7 illustrates a process of beam configuration and activation for a PDSCH according to an embodiment of the disclosure.

First, a list of TCI states may be indicated through a higher-layer list such as RRC (operation 7-00). The list of TCI states may be indicated by, for example, "tci-StatesToAddModList" and/or "tci-StatesToReleaseList" in a PDSCH-Config IE for each BWP. Next, some of the list of TCI states may be activated by the MAC-CE (operation 7-20). The maximum number of the activated TCI states may be determined according to the capability reported by the terminal. Operation 7-50 illustrates an example of a MAC-CE structure for TCI state activation/deactivation of a Rel-15-based PDSCH.

The meaning of each field and a value configured for each field in the MAC-CE are as follows.

Serving Cell Identifier (Serving Cell ID): This field indicates the identity of the Serving Cell for which the MAC CE applies. The length of the field is 5 bits;

Bandwidth Part Identifier (BWP ID): This field indicates a DL BWP for which the MAC CE applies as the codepoint of the DCI bandwidth part indicator field as specified in TS 38.212 [9]. The length of the BWP ID field is 2 bits;

TCI state Identifier i (Ti): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e., the first TCI State with Ti field set to 1 shall be mapped to the codepoint value 0, second TCI State with Ti field set to 1 shall be mapped to the codepoint value 1 and so on. The maximum number of activated TCI states is 8;

Reserved Bit (R): Reserved bit, set to 0.

When the terminal has received DCI format 1_1 or DCI format 12, the terminal may receive, based on transmission configuration indication (TCI) field information in the DCI, a PDSCH by a beam of TCI states activated by the MAC-CE (operation 7-40). Whether the TCI field exists may be determined by a tci-PresentinDCI value indicating a higher-layer parameter in a CORESET configured to reception of the DCI. When tci-PresentinDCI is configured to be "enabled" in the higher layer, the terminal may identify a TCI field having 3-bit information and determine the TCI states activated in the DL BWP or the scheduled component carrier and the direction of a beam associated with the DL-RS.

In the LTE and NR system, in the state in which the terminal is connected to the serving base station, a procedure of reporting the capability supported by the terminal to the corresponding base station is performed. In the following description, the procedure may be referred to as "UE capability (report)". The base station may transfer a UE capability enquiry message requesting the capability report to the terminal in the connection state. The message may include a UE capability requested by the base station for each RAT type. The request for each RAT type may include required frequency band information. In addition, multiple RAT types may be request through the UE capability enquire message in one RRC message container, or multiple UE capability enquire messages including a request for each RAT type may be transferred to the terminal. That is, the UE capability enquiry may be repeated multiple times, and the terminal may configure the UE capability information message relating to the enquiry and report the message multiple times. In the next-generation mobile communication system, the UE capability request for NR, LTE, EN-DC, and MR-DC can be made. Generally, the UE capability enquiry message is initially transmitted after the terminal is connected, but the base station may request the message as necessary in some conditions.

In the above operation, the terminal having received the UE capability report request from the base station configures the terminal (UE) capability according to the RAT type or band information request by the base station. A scheme of configuring UE capability by the terminal in the NR system is described as below:

1. When the terminal receives a list relating to the LTE and/or NR band upon the UE capability request from the base station, the terminal configures a band combination (BC) for EN-DC and NR stand-alone (SA). That is, the terminal configures, based on the bands requested from the base station through FreqBandList, a candidate list of BCs for EN-DC and NR SA. In addition, the bands have priorities as in the order listed in FreqBandList.

2. When the base station sets an "eutra-nr-only" flag or an "eutra" flag and requests a UE capability report, the terminal completely removes NR SA BCs from the above-configured candidate list of BCs. This operation can be performed when the LTE base station (eNB) request "eutra" capability.

3. Later, the terminal removes fallback BCs from the candidate list of BCs configured in the above operation. In this case, if the fallback BC corresponds to a super set BC from which a band corresponding to one initial SCell is removed, and the super set BC can cover the fallback BC already, the fallback BC can be omitted. This operation is applied to the MR-DC, that is, the LTE bands. The remaining BCs after this operation correspond to the final "candidate BC list".

4. The terminal selects BCs suitable for the request RAT type from the final "candidate BC list" and selects BCs to be reported. In this operation, the terminal configures supportedBandCombinationList according to a predetermined order. That is, the terminal configures the UE capability and BC to be reported according to a preconfigured rat-Type order. (nr→eutra-nr→eutra). In addition, the terminal configures featureSetCombination for the configured supportedBandCombinationList and configures a "candidate feature set combination" list from the candidate BC list from which a list of the fallback BCs (including the capability in the level equal to or lower than those of the other BCs) is removed. The "candidate feature set combination" includes all feature set combinations for the NR and EUTRA-NR BC, and may be acquired from the feature set combination of the UE-NR-Capabilities and UE-MRDC-Capabilities container.

5. In addition, when the request RAT type is "eutra-nr" and affects, featureSetCombinations are included in both containers of UE-MRDC-Capabilities and UE-NR-Capabilities. However, the feature set of the NR is included only in the UE-NR-Capabilities.

Once the terminal (UE) capability is configured, the terminal transfers a UE capability information message including the UE capability to the base station. The base station performs, based on the UE capability received from the terminal, scheduling and reception or transmission management suitable for the corresponding terminal later.

When an interval between a symbol at which PDCCH transmission ends and a start symbol of a PDSCH scheduled by the PDCCH has a value smaller than a particular threshold, the terminal may fail to complete PDCCH decoding at the time when receiving the PDSCH. This means that beam information indicated for PDSCH reception by DCI of the PDCCH fails to be received. In this case, the base station and the terminal may designate a default beam for PDSCH reception. That is, in this case, the base station transmits the PDSCH by using the designated default beam, and the terminal performs buffering by using the designated default beam. When the terminal determines after PDCCH decoding that there was a PDSCH scheduled before PDCCH decoding, PDSCH decoding may be performed from a signal buffered according to the default beam. Here, the above-mentioned threshold may be a value of timeDurationForQCL reported by the terminal (UE) capability. The default beam operation may be limited to the case in which one or more TCI states among the TCI state list 7-00 configured for the PDSCH include QCL-TypeD, that is, the case of accompanying reception beam configuration of the terminal. In this case, the default beam may correspond to a beam configured in a CORESET (e.g., CORESET #0) corresponding to the lowest ID, among CORESETs corresponding to monitored search spaces of the most recent slot with reference to a PDSCH reception slot.

The default beam operation for PDSCH reception may be limited to the case in which no cross-carrier configuration for the PDSCH is made.

Figure 8:
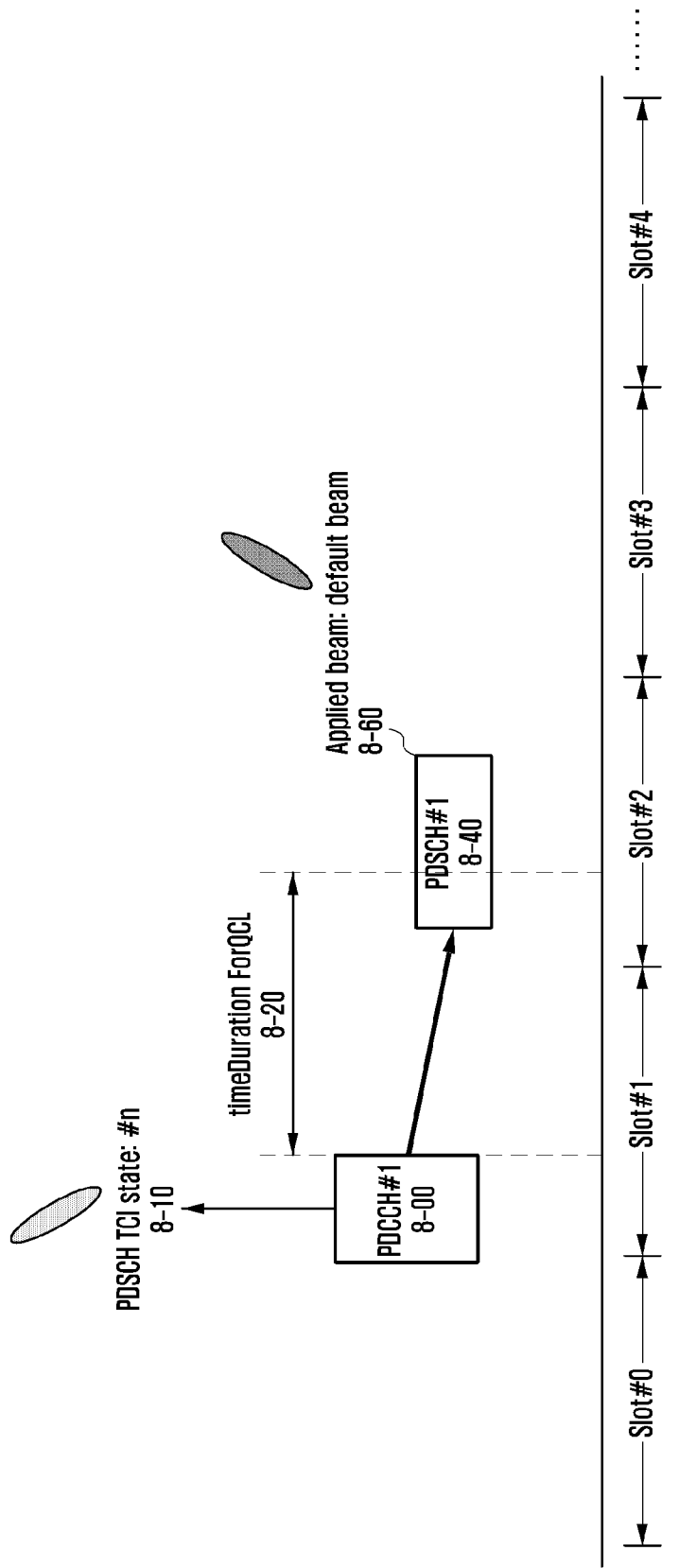
FIG. 8 illustrates an example of a PDSCH default beam operation according to an embodiment of the disclosure.

FIG. 8 illustrates an example of a PDSCH default beam operation according to an embodiment of the disclosure.

In the DCI transmitted via a PDCCH 8-00, in a case in which a TCI field for PDSCH reception corresponds to TCI state #n 8-10, when an interval between a symbol at which PDCCH transmission ends and a start symbol of a PDSCH 8-40 scheduled by the PDCCH is shorter than timeDurationforQCL 8-20, and at least one TCI state among a list of TCI states configured for a PDSCH via RRC includes QCL-TypeD, a default beam 8-60 is applied to the PDSCH.

When no parameter tci-PresetinDCI is configured in a CORESET or when the PDSCH is scheduled by DCI format 1_0, a beam for PDSCH reception may not be indicated to the terminal via the DCI since no TCI field exists in the DCI. In this case, when an interval between a symbol in which PDCCH transmission ends and a start symbol of a PDSCH scheduled by the PDCCH has a value equal to or larger than timeDurationforQCL, the terminal assumes that a beam for PDSCH reception is identical to a beam configured/activated in a PDCCH transmission CORESET, and the base station may configure a PDSCH transmission beam in accordance with the assumption made by the terminal. The default beam operation for PDSCH reception may be limited to the case of no cross-carrier configuration for the PDSCH.

In the NR system, when the base station schedules a PDSCH by using DCI format 1_0 or DCI format 1_1 for the terminal, the terminal transmits HARQ-ACK feedback information relating to the PDSCH via a physical uplink control channel (PUCCH) to the base station. The base station indicates a slot, to which a PUCCH for transmitting HARQ-ACK feedback information is mapped, and a type of a PUCCH resource via DCI for scheduling a PDSCH to the terminal. Specifically, the base station may indicate a slot offset between the PDSCH and the PUCCH for transmitting HARQ-ACK feedback information, via a PDSCH-to-HARQ_feedback timing indicator field of the DCI for scheduling the PDSCH. In addition, the base station may indicate a type of a PUCCH resource for transmitting HARQ-ACK feedback information through a PUCCH resource indicator of the DCI for scheduling the PDSCH.

Figure 9:
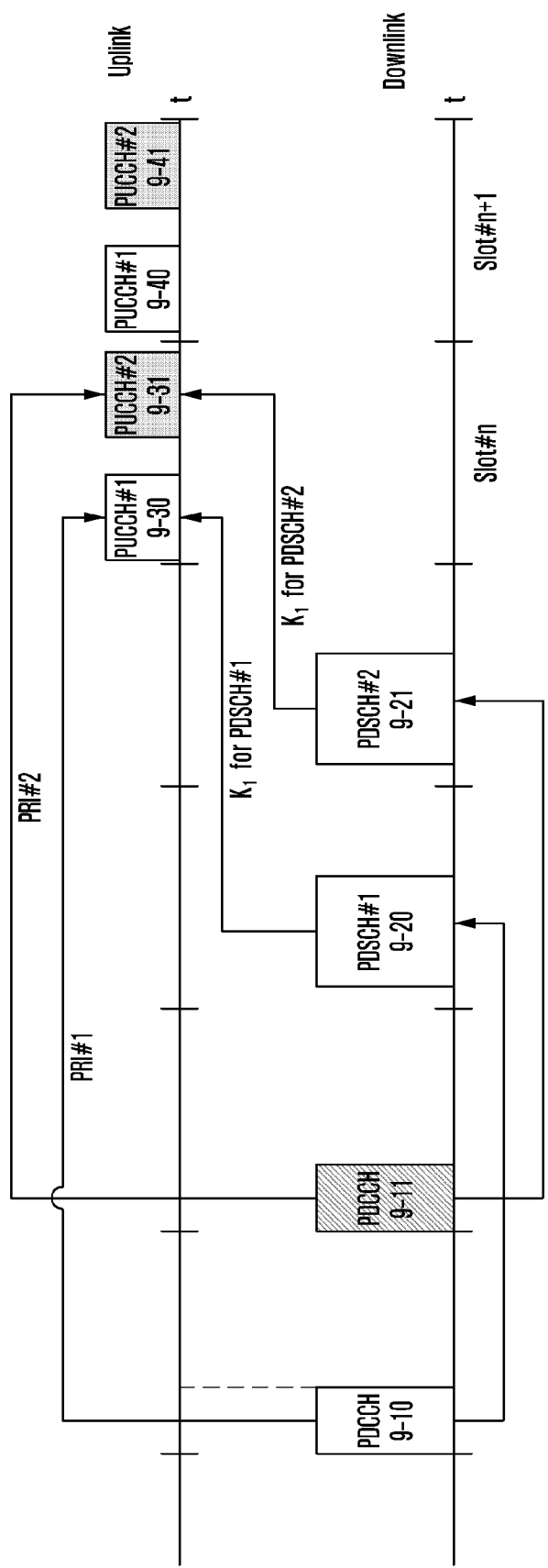
FIG. 9 illustrates an example of PUCCH resource allocation on an HARQ-ACK feedback according to an embodiment of the disclosure.

FIG. 9 illustrates an example of PUCCH resource allocation on an HARQ-ACK feedback according to an embodiment of the disclosure.

When a PDSCH 9-20, 9-21 performs scheduling based on DCI of a PDCCH 9-10, 9-11, the PDSCH is transmitted, slot information to which a PUCCH 99-30, 9-31 including the HARQ-ACK feedback corresponding thereto is mapped, and symbol mapping information in a slot of the PUCCH 9-30, 9-31 including an HARQ-ACK feedback is transferred. Specifically, a slot interval K2 between a PDSCH and an HARQ-ACK feedback corresponding thereto is indicated via a PDSCH-to-HARQ_feedback timing indicator, and a candidate value of the slot interval is configured via higher-layer signaling or is indicated by one of eight feedback timing offsets predetermined from 1 to 8. In addition, in order to transfer a PUCCH resource including a PUCCH-format for mapping HARQ-feedback information, a start symbol position, and the number of mapping symbols, one of eight resources configured in a higher layer by using a PUCCH resource indicator is indicated. The terminal determines a time-axis mapping position of a PUCCH including an HARQ-ACK feedback with reference to the slot interval between the PDSCH and the HARQ-ACK feedback corresponding thereto and the start symbol position and the number of mapping symbols configured in the PUCCH resource. In addition, HARQ-ACK feedback information is mapped according to the PUCCH-format configured in the PUCCH resource.

A spatial domain transmission filter of a terminal for transmitting a PUCCH follows spatial relation information (info) of a PUCCH activated for a PUCCH resource via higher-layer signaling including a MAC CE. In a case in which the activated spatial relation info of the PUCCH resource refers to a CSI-reference signal (RS) resource or synchronization signal/physical broadcast channel block (an SS/PBCH block (SSB)), the terminal may transmit a PUCCH by using a spatial domain transmission filter such as a spatial domain reception filter used when receiving the referred CSI-RS resource or SSB. Alternatively, when the activated spatial relation info of the PUCCH resource refers to a sounding reference signal (SRS) resource index, the terminal may transmit a PUCCH by using a spatial domain transmission filter used when transmitting the referred SRS resource. The configuration may include information as shown in [Table 16].

TABLE 16

```
PUCCH-SpatialRelationInfo ::=         SEQUENCE {
    pucch-SpatialRelationInfoId       PUCCH-SpatialRelationInfoId,
    servingCellId                         ServCellIndex
OPTIONAL,   -- Need S
    referenceSignal                       CHOICE {
        ssb-Index                             SSB-Index,
        csi-RS-Index                          NZP-CSI-RS-ResourceId,
        srs                                   SEQUENCE {
                                                  resource
SRS-ResourceId,
                                                  uplinkBWP
BWP-Id
                                              }
    },
    pucch-PathlossReferenceRS-Id      PUCCH-PathlossReferenceRS-Id,
    p0-PUCCH-Id                           P0-PUCCH-Id,
    closedLoopIndex                       ENUMERATED { i0, i1 }
}
PUCCH-SpatialRelationInfoId ::=       INTEGER (1..maxNrofSpatialRelationInfos)
-- TAG-PUCCH-SPATIALRELATIONINFO-STOP
-- ASN1STOP
```

In a case of a system performing communication in an unlicensed band, a transmission device (a base stion or a terminal) for transmitting a signal via an unlicensed band may perform a channel access procedure (or listen-before talk (LBT) with respect to the unlicensed band, which is subjected to the communication, before transmitting the signal, and when it is determined that the unlicensed band is in an idle state upon the result of the channel access procedure, the transmission device may access the unlicensed band and transmit the signal. When it is determined that the unlicensed band is not in the idle state upon the result of the channel access procedure, the transmission device may not transmit the signal.

In general, according to a channel access procedure in an unlicensed band, the transmission device may measure the strength of a signal received via the unlicensed band for a fixed time or for a time calculated according to a predefined rule (for example, a time calculated at least by using one random value selected by the base station or the terminal), and may compare the strength of the received signal with a threshold value defined in advance or acquired by using a function, which includes at least one variable of the channel bandwidth, the signal bandwidth through which a signal to be transmitted is transmitted, the strength of transmission power, or the like and determines the strength of the received signal. As a result, the device can determine whether the unlicensed band is in the idle state.

For example, in a case in which the transmission device measures the strength of a signal for X us (for example, 25 us) immediately before the time to transmit a signal, when the strength of the signal is less than threshold T (for example, −72 dBm) pre-defined or calculated, the transmission device may determine that the unlicensed band is in the idle state and transmit the configured signal. In this case, the maximum time available for consecutive transmission of signals after the channel access procedure may be limited according to a maximum channel occupancy time defined according to each country, region, or frequency band for each unlicensed band, and may be also limited according to a type of a transmission device (for example, the base station, the terminal, a master device, or a slave device). For example, in Japan, the base station or the terminal in 5 GHz of the unlicensed band may perform the channel access procedure and then may transmit, during a maximum of 4 ms, a signal by occupying a channel without additionally performing the channel access procedure, via the unlicensed band, the state of which is determined to be idle upon the result of the channel access procedure.

More specifically, when the base station or the terminal attempts to transmit a downlink or uplink signal via the unlicensed band, the channel access procedure that the base station or the terminal can perform may be at least divided into the following types and described accordingly:

Type 1: Perform channel access procedure for variable time and then transmit up/downlink signal Type 2: Perform channel access procedure for fixed time and then transmit up/downlink signal Type 3: Transmit downlink or uplink signal without performing channel access procedure A transmission node (hereinafter, referred to as a "base station" or a "terminal") which attempts to transmit a signal via an unlicensed band may determine a channel access procedure type according to a type of a signal to be transmitted. For example, when the base station attempts to transmit a downlink signal including a downlink data channel via an unlicensed band, the base station may perform a type-1 channel access procedure. In addition, when the base station attempts to transmit a downlink signal including no downlink data channel via an unlicensed band, for example, when the base station attempts to transmit a synchronous signal or a downlink control channel, the base station may perform a type-2 channel access procedure and may then transmit the downlink signal.

In this case, the channel access procedure type may also be determined according to the transport length of the signal to be transmitted via the unlicensed band, or the length of the time or interval for which the unlicensed band is occupied and used. In a case of a type-1 channel access procedure, it may be necessary to perform the channel access procedure for a longer time than the time required when performing the type-2 channel access procedure. Accordingly, when a signal is to be transmitted for a short time interval or for a time equal to or less than a reference time (for example, X ms or Y symbols), the type-2 channel access procedure may be performed. On the other hand, when a signal is to be transmitted for a long time interval or for a time longer than or equal to the reference time (for example, X ms or Y symbols), the type-1 channel access procedure may be performed. In other words, the transmission node may perform the different types of channel access procedures according to the unlicensed band usage time.

When the type-1 channel access procedure is performed according to at least one of the references above, a channel access priority class (CAPC) may be determined according to the quality of a service class identifier (QCI) of the signal to be transmitted via the unlicensed band, and the channel access procedure may then be performed by using at least one of predefined configuration values, as shown in Table 1, with regard to the determined channel access priority class. For example, QCI 1, 2, and 4 correspond to QCI values for services such as conversational voice, conversational video (live streaming), and non-conversational video (buffered streaming), respectively. When a signal for a service that does not match any QCI in Table 1 is to be transmitted via the unlicensed band, a QCI closest to the service and the QCI shown in Table 17 may be selected, and a channel access priority class related thereto may be selected.

Table 17 shows mapping relations between channel access priority classes and QCIs.

TABLE 17

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

For example, a defer duration, a set of values or sizes of a contention window ($CW\_p$), the minimum value and the maximum value of the contention window ($CW\_min,p$ and $CW\_max,p$), the maximum channel occupiable interval ($T\_mcot,p$), or the like according to the determined channel access priority (p) may be determined from Table 18. In other words, a base station that attempts to transmit a downlink signal via an unlicensed band performs a channel access procedure with respect to the unlicensed band for a minimum time of $T\_f+mp*T\_sl$. When the channel access procedure is to be performed according to channel access priority class 3 (p=3), the size ($T\_f+mp*T\_sl$) of the defer duration necessary to perform the channel access procedure is configured by using mp=3. When it is determined that the unlicensed band is in the idle state throughout the entire time of $mp*T\_sl$, then N=N−1. In this case, N has a value selected as a predetermined integer value from values between zero and a value ($CW\_p$) of the contention window at the time point at which the channel access procedure is performed. When the channel access priority class is 3 (p=3), the minimum contention window value and the maximum contention window value are 15 and 63, respectively. When it is determined that the unlicensed band is in the idle state in the defer duration and in the interval in which an additional channel access procedure is performed, the base station may transmit a signal via the unlicensed band for a time of $T\_mcot,p$ (8 ms). Table 18 below shows channel access priority classes in the downlink. Although downlink channel access priority classes will be used in the description of the disclosure for convenience of description, uplink channel access priority classes in Table 18 may be reused, or separate channel access priority classes for uplink transmission may be defined and used.

TABLE 18

| Channel Access Priority Class (p) | $m_p$ | $CW_{min,p}$ | $CW_{max,p}$ | $CW_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1063 | 8 or 10 ms | {15, 31, 63, 127, 255, 511, 1023} |

The base station may configure channel access procedure performing information required for uplink transmission of the terminal by using a table via higher-layer signaling (for example, SIB, MIB, MAC-CE, and RRC signaling). Each column in the table may include at least one of a channel access procedure type, a channel access priority class, or a cyclic prefix (CP) extension value or a timing advance (TA) value of uplink (or downlink) OFDM symbol transmission. For example, when the base station indicates uplink transmission to the terminal by using DCI format 0_0, the base station indicates the corresponding column in Table 19 by using a 2-bit "ChannelAccess-CPext" field included in the corresponding DCI so as to indicate information required for the channel access procedure and uplink transmission to the terminal.

TABLE 19

| Bit field mapped to index | Channel Access Type | CP extension |
|---|---|---|
| 0 | Type 3 | C2*symbol length - 16 us - TA |
| 1 | Type 2 | C3*symbol length - 25 us - TA |
| 2 | Type 2 | C1*symbol length - 25 us |
| 3 | Type1 | 0 |

When the base station indicates uplink transmission to the terminal by using DCI format 0_0, the base station may indicate information required for the channel access procedure and uplink transmission to the terminal by using Table 20 and a "ChannelAccess-CPext" field included in the corresponding DCI.

TABLE 20

| Entry index | Channel Access Type | CP extension | CAPC |
|---|---|---|---|
| 0 | Type3 | 0 | 1 |
| 1 | Type3 | 0 | 2 |
| 2 | Type3 | 0 | 3 |
| 3 | Type3 | 0 | 4 |
| 4 | Type3 | C2*symbol length - 16 us - TA | 1 |
| 5 | Type3 | C2*symbol length - 16 us - TA | 2 |
| 6 | Type3 | C2*symbol length - 16 us - TA | 3 |
| 7 | Type3 | C2*symbol length - 16 us - TA | 4 |
| 8 | Type2 with 16 us | 0 | 1 |
| 9 | Type2 with 16 us | 0 | 2 |
| 10 | Type2 with 16 us | 0 | 3 |
| 11 | Type2 with 16 us | 0 | 4 |
| 12 | Type2 with 16 us | C2*symbol length - 16 us - TA | 1 |
| 13 | Type2 with 16 us | C2*symbol length - 16 us - TA | 2 |
| 14 | Type2 with 16 us | C2*symbol length - 16 us - TA | 3 |
| 15 | Type2 with 16 us | C2*symbol length - 16 us - TA | 4 |
| 16 | Type2 with 25 us | 0 | 1 |
| 17 | Type2 with 25 us | 0 | 2 |
| 18 | Type2 with 25 us | 0 | 3 |
| 19 | Type2 with 25 us | 0 | 4 |
| 20 | Type2 with 25 us | 1*symbol length - 25 us | 1 |

TABLE 20-continued

| Entry index | Channel Access Type | CP extension | CAPC |
|---|---|---|---|
| 21 | Type2 with 25 us | 1*symbol length - 25 us | 2 |
| 22 | Type2 with 25 us | 1*symbol length - 25 us | 3 |
| 23 | Type2 with 25 us | 1*symbol length - 25 us | 4 |
| 24 | Type2 with 25 us | C3*symbol length - 25 us - TA | 1 |
| 25 | Type2 with 25 us | C3*symbol length - 25 us - TA | 2 |
| 26 | Type2 with 25 us | C3*symbol length - 25 us - TA | 3 |
| 27 | Type2 with 25 us | C3*symbol length - 25 us - TA | 4 |
| 28 | Type1 | 0 | 1 |
| 29 | Type1 | 0 | 2 |
| 30 | Type1 | 0 | 3 |
| 31 | Type1 | 0 | 4 |
| 32 | Type1 | 1*symbol length - 25 us | 1 |
| 33 | Type1 | 1*symbol length - 25 us | 2 |
| 34 | Type1 | 1*symbol length - 25 us | 3 |
| 35 | Type1 | 1*symbol length - 25 us | 4 |
| 36 | Type1 | C2*symbol length - 16 us - TA | 1 |
| 37 | Type1 | C2*symbol length - 16 us - TA | 2 |
| 38 | Type1 | C2*symbol length - 16 us - TA | 3 |
| 39 | Type1 | C2*symbol length - 16 us - TA | 4 |
| 40 | Type1 | C3*symbol length - 25 us - TA | 1 |
| 41 | Type1 | C3*symbol length - 25 us - TA | 2 |
| 42 | Type1 | C3*symbol length - 25 us - TA | 3 |
| 43 | Type1 | C3*symbol length - 25 us - TA | 4 |

The base station may configure, for the terminal via higher-layer signaling, one or more entries from the column of Table 20, and one of the one or more entries in Table 20, which is configured for the terminal by the base station, may be indicated to the terminal by the base station by using a "ChannelAccess-CPext" field. In this case, the size of the "ChannelAccess-CPext" field is determined by $\lceil \log_2(l) \rceil$, and l means the number of entries configured by the base station via higher-layer signaling.

The initial contention window value (CW_p) is the minimum value of the contention window (CW_min,p). The base station that has selected the N value may perform the channel access procedure in the T_sl interval, and when it is determined that the unlicensed band is in the idle state according to the channel access procedure performed in the T_sl interval, the base station may change the N value to be N=N-1, and may transmit a signal for the maximum time of T_mcot,p via the unlicensed band when N=0. When it is determined through the channel access procedure in the T_sl interval that the unlicensed band is not in the idle state, the base station may perform the channel access procedure again without changing the N value.

The contention window value (CW_p) may be changed based on the result of receiving a downlink data channel transmitted through a reference frame or a reference slot within a downlink signal transport interval (or maximum channel occupancy time (MCOT)) most recently transmitted via the unlicensed band at the time point at which the base station initiates the channel access procedure, or at or immediately before the time point at which the base station selects the N value to perform the channel access procedure. In other words, the base station may receive, from the terminal, a report of the reception result of the downlink data transmitted through the reference subframe or the reference slot, and may increase or minimize the size of CW_p according to the ratio (Z) of NACKs among the received report of reception results.

Figure 10:
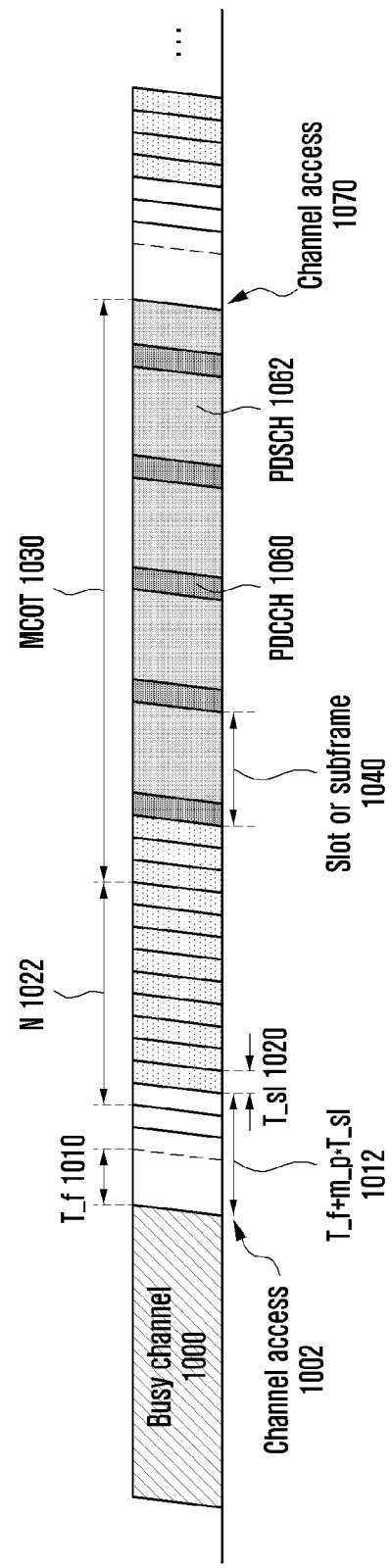
FIG. 10 illustrates a channel access procedure in an unlicensed band according to an embodiment of the disclosure.

FIG. 10 illustrates a channel access procedure in an unlicensed band according to an embodiment of the disclosure.

For example, referring to FIG. 10, the first transport interval 1040 (hereinafter, referred to as a "slot" or a "subframe") of a downlink signal transport interval 1030 most recently transmitted via the unlicensed band at the time point 1070 at which the base station initiates the channel access procedure, or at or immediately before the time point at which the base station selects the N value to perform the channel access procedure, may be a reference slot to change the contention window for the channel access procedure 1070. When the base station is not able to receive the result of receiving the downlink data channel transmitted via the first slot 1040 of the transport interval 1030, for example, when a time interval between the first subframe and the time point 1070 at which the base station initiates the channel access procedure is equal to or less than n slots or subframes, that is, when the base station initiates the channel access procedure before the time at which the terminal is able to report the result of receiving the downlink data channel with respect to the first slot 1040, the first subframe of the most recent downlink signal transport interval transmitted before the downlink signal transport interval 1030 becomes a reference subframe. In other words, when the base station is not able to receive, from the terminal, the result of receiving the downlink data transmitted via the reference subframe 1040 at the time point 1070 at which the base station initiates the channel access procedure, or at or immediately before the time point at which the base station selects the N value to perform the channel access procedure, the base station may determine that, among the reception results with respect to the downlink data channel already received from the terminals, the first subframe of the most recently transmitted downlink signal transport interval is the reference subframe. In addition, the base station may determine the size of the contention window used for the channel access procedure 1070 by using the downlink data reception results received from the terminals with respect to the downlink data transmitted through the downlink data channel in the reference subframe.

For example, the base station, which has transmitted the downlink signal through the channel access procedure (for example, CW_p=15) configured through the channel access priority class 3 (p=3), may increase the contention window from the initial value (CW_p=15) to the next contention window value (CW_p=31) when it is determined that 80% or more of the reception results from the terminal with respect to the downlink signal transmitted through the downlink data channel in the first subframe, among downlink signals transmitted via the unlicensed band, are NACKs.

When it is not determined that 80% or more of the reception results from the terminal are NACKs, the base station may maintain the contention window value as the existing value or may change the contention window value to the initial value. In this case, the contention window change may be commonly applied to all channel access priority classes, or may be applied only to the channel access priority class used for the channel access procedure. Here, a scheme of determining a reception result useful for determining the contention window size change, from among results of receiving a downlink signal transmitted or reported to the base station by the terminal, with respect to the downlink signal transmitted through the downlink data channel in the reference subframe for determining a contention window size change, that is, a scheme of determining a Z value is as follows.

When the base station transmits at least one codeword or TB to at least one terminal in the reference subframe or the reference slot, the base station may configure the ratio of NACKs among the results of receiving the TB received in the reference subframe or the reference slot, the results being transmitted or reported by the terminal, as the Z value. For example, when two codewords or two TBs are transmitted to one terminal in the reference subframe or the reference slot, the base station receives a downlink data signal reception result with respect to the two TBs, the result being transmitted or reported by the terminal. When the ratio (Z) of NACKs among the two reception results is equal to or larger than a threshold value (for example, Z=80%) defined in advance or configured between the base station and the terminal, the base station may change or increase the contention window size.

When the terminal bundles downlink data reception results regarding at least one subframe (for example, M subframes), including the reference subframe or the reference slot, and transmits or reports the same to the base station, the base station may determine that the terminal has transmitted M reception results. In addition, the base station may determine that the ratio of NACKs among the M reception results is the Z value, and may change, maintain, or initialize the contention window size.

When the reference subframe corresponds to a reception result relating to the second slot among two slots constituting one subframe, the Z value may be determined according to the ratio of NACKs among the results, from the terminal, of receiving downlink signals in the reference subframe (in other words, the second slot) and the next subframe.

When downlink control information or scheduling information relating to a downlink data channel, which is transmitted by the base station, is transmitted through the same cell or frequency band as the cell or frequency band through which the downlink data is transmitted, or in a case where scheduling information regarding a downlink data channel or downlink control information is transmitted through an unlicensed band but is transmitted in a cell or frequency different from the cell or the frequency in which the downlink data is transmitted, when it is determined that the terminal has transmitted no result of receiving downlink data received in the reference subframe or the reference slot, or when it is determined that a downlink data reception result transmitted by the terminal includes discontinuous transmission (DTX), NACK/DTX, or any state, the base station may determine that the reception result from the terminal is NACK, thereby determining the Z value.

In addition, in a case where downlink control information or scheduling information relating to a downlink data channel, which is transmitted by the base station, is transmitted via a licensed band, when it is determined that a downlink data reception result transmitted by the terminal includes DTX, NACK/DTX, or any state, the base station may not include the reception result from the terminal in the contention window change reference value Z. In other words, the base station may ignore the reception result from the terminal and determine the Z value.

In addition, in a case where the base station transmits scheduling information relating to a downlink data channel or downlink control information via a licensed band, when the base station has not actually transmitted the downlink data (no transmission), the base station may ignore reception results transmitted or reported by the terminal with respect to the downlink data, among reception results of the downlink data with respect to the reference subframe or the reference slot, the result being transmitted or reported to the base station by the terminal, and may determine the Z value.

In a case of an NR communication system, an uplink signal (a configured grant PUSCH (CG-PUSCH) may be transmitted without uplink scheduling information in order to provide various services and to support a high data transmission rate. More specifically, when an uplink signal is to be transmitted without uplink scheduling information, information such as resource assignment for uplink transmission and a modulation and coding scheme (MCS) may be configured via RRC signaling or DCI of the PDCCH. The uplink transmission may be at least divided into the following types according to the uplink transmission configuration reception type and may be described accordingly:

Type 1: uplink transmission configuration using RRC signaling

Type 2: uplink transmission configuration using physical-layer downlink control channel In type 1, the base station may configure, for the terminal, a particular time/frequency resource for allowing grant-free-based PUSCH transmission, via higher-layer signaling, for example, via RRC signaling. Further, the base station may configure, for the terminal, various parameters for PUSCH transmission (for example, frequency hopping, DMRS configuration, an MCS table, an MCS, a resource block group (RBG) size, the number of repetitive transmissions, a redundancy version (RV), etc.), via higher-layer signaling. When the terminal receives configuration information for type-1 PUSCH transmission from the base station, the terminal may transmit the PUSCH via a periodically configured resource without a grant from the base station. All of the various parameters required for PUSCH transmission (for example, frequency hopping, DMRS configuration, an MCS, an RBG size, the number of repetitive transmissions, an RV, the number of precoding layers, an antenna port, a frequency hopping offset, etc.) may follow the configuration value reported by the base station.

In type 2, the base station may configure, for the terminal, some information (for example, period information, etc.) on a particular time/frequency resource for allowing grant-free-based PUSCH transmission, via higher-layer signaling (for example, RRC signaling). Further, the base station may configure, for the terminal, various parameters for PUSCH transmission (for example, frequency hopping, DMRS configuration, an MCS table, an RBG size, the number of repetitive transmissions, an RV, etc.), via higher-layer signaling. The base station may transmit DCI (validation DCI) including a particular DCI field for the purpose of scheduling activation or scheduling release for type-2 CG-PUSCH. More specifically, the base station may configure an CS-RNTI for the terminal, and the terminal may monitor a DCI format with CRC-scrambled by the CS-RNTI. When the terminal receives a DCI format with CRC-scrambled by the CS-RNTI, and a new data indication value included in the corresponding DCI is 0, the terminal may determine that the corresponding DCI corresponds to DCI (validation DCI) for scheduling activation or scheduling release for the type-2 CG-PUSCH. When the validation of the type-2 CG-PUSCH transmission is completed, the terminal may determine, with reference to a particular field value of the terminal, whether the type-2 CG-PUSCH transmission is to be activated or released. For example, when the particular field value has a value shown in Table 21 according to the DCI format, the terminal may determine that the type-2 CG-PUSCH is to be activated. In another example, when the particular field value has a value shown in Table 22 according to the DCI format, the terminal may determine that the type-2 CG-PUSCH is released.

TABLE 21

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 22

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

Figure 11A:
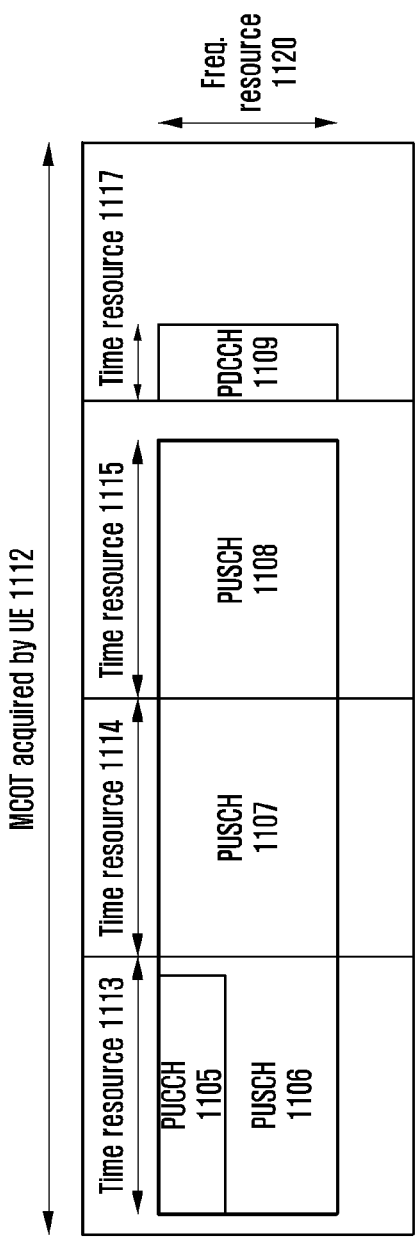
FIG. 11A illustrates a configured-grant transmission example according to an embodiment of the disclosure.
Figure 11B:
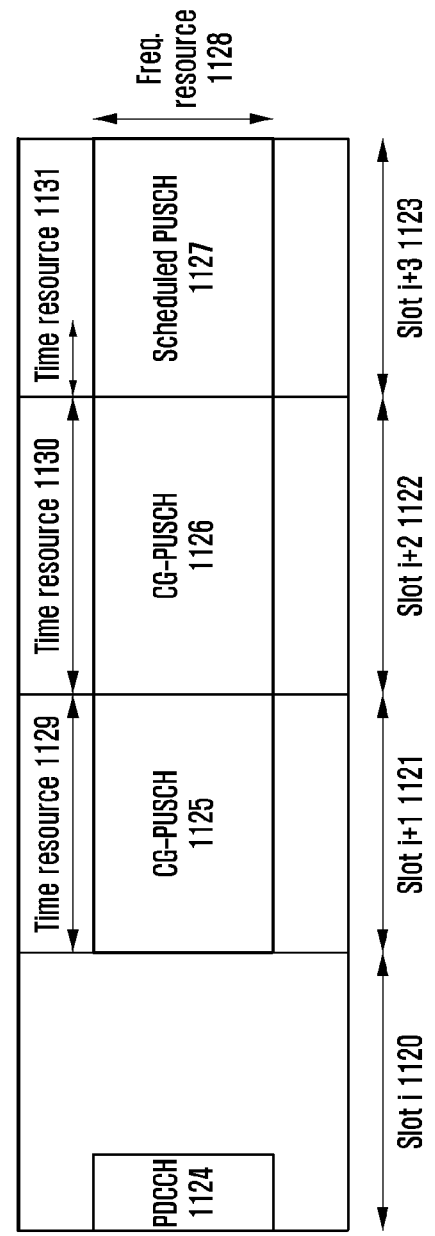
FIG. 11B illustrates a configured-grant transmission example according to an embodiment of the disclosure.

FIG. 11A illustrates a case in which an uplink signal is transmitted without uplink scheduling information in an unlicensed band according to an embodiment of the disclosure, and FIG. 11B illustrates a case in which an uplink signal is transmitted without uplink scheduling information in an unlicensed band according to an embodiment of the disclosure. A channel access procedure is performed to transmit an uplink signal without uplink scheduling information in an unlicensed band. In this case, when the terminal accesses the unlicensed band by performing a channel access procedure for a variable time, the terminal may schedule downlink transmission in the last slot 1104 or last subframe 1104 within the maximum channel occupancy time 1112 through a channel occupancy time sharing indicator of uplink control information 1105. Here, the base station determines channel access by performing a channel access procedure for a fixed time, and the terminal configures the one last symbol of the slot 1108 or subframe 1108 for uplink transmission as a gap guard emptied for the channel access procedure of the base station. When transmitting a CG-PUSCH in the unlicensed band, the terminal may include CG uplink control information (UCI) including, in the CG-PUSCH, an HARQ ID of the CG-PUSCH, an RV, and CG-PUSCH scheduling information, and transmit the same. Here, all CG-PUSCHs may include at least one piece of CG-UCI.

As shown in FIG. 11B, the terminal may receive, from the base station via a UL grant (1124), scheduling of PUSCH transmission 1127 in the slot 1123 subsequent to CG-PUSCH transmission. In this case, when a terminal other than the corresponding terminal also receives the scheduling of PUSCH transmission in the slot 1123, the other terminals may not receive the scheduled PUSCH transmission due to channel access procedure failure caused by the CG-PUSCH transmission 1126 in the slot 1122 immediately before the corresponding terminal. In general, when it is assumed that the scheduled PUSCH has a priority higher than that of the CG-PUSCH, a method of transmitting PUSCHs consecutively scheduled after the slot 1126 in which the CG-PUSCH is transmitted is required to be proposed. Accordingly, the disclosure proposes a method of transmitting scheduled PUSCHs when the PUSCH transmissions scheduled by the base station are consecutively scheduled after the CG-PUSCH transmission.

Hereinafter, a case in which the base station transmits a downlink signal to the terminal via the unlicensed band, and a case in which the terminal transmits an uplink signal to the base station via the unlicensed band are interchangeably used in the description, or one of the cases is used as an example in the description. However, also in the opposite case, that is, when a case in which the terminal transmits an uplink signal to the base station via the unlicensed band, or a case in which the base station transmits a downlink signal to the terminal via the unlicensed band, the content proposed in the disclosure can be applied identically or is applicable through some modifications. Therefore, detailed descriptions of the downlink signal transmission or reception will be omitted. In addition, it is assumed that one downlink data information (a codeword or a TB) or uplink data information is transmitted or received between the base station and the terminal. However, the content proposed in the disclosure is also applicable to a case in which the base station transmits a downlink signal to a plurality of terminals or a case in which a plurality of codewords or TBs are transmitted or received between the base station and the terminal. In addition, the disclosure specifies the scheduled PUSCH and the CG-PUSCH in the description, but the scheduled PUSCH is applicable for an uplink signal (for example, a PUSCH, a PRACH, an SRS, and a PUCCH) scheduled via DCI, and the CG-PUSCH is applicable for an uplink signal (for example, a PUSCH, a PRACH, an SRS, and a PUCCH) configured via higher-layer signaling.

The disclosure is described with reference to an NR system in order to describe a method and an apparatus proposed in embodiments of the disclosure and in the wireless communication system. However, the content of the disclosure is not limited to the NR system and is applicable to various wireless communication systems such as LTE, LTE-A, LTE-A-Pro, and 5G. In addition, the content of the disclosure is described with reference to a system and an apparatus for transmitting or receiving a signal by using an unlicensed band, but is applicable to a system operating in a licensed band. Furthermore, a base station and a terminal operating in an unlicensed band is assumed and described in embodiments of the disclosure. However, a method and an apparatus proposed in embodiments of the disclosure are applicable to the base station and the terminal operating not only in an unlicensed band but also in a licensed band, a shared spectrum, or a sidelink.

In the disclosure, higher-layer signaling or a higher-layer signal means a signal transmission scheme in which a base station transmits a signal to a terminal by using a physical-layer downlink data channel, or a terminal transmits a signal to a base station by using a physical-layer uplink data channel, and may include a signal transmission scheme in which a signal is transmitted via RRC signaling, PDCP signaling, or a MAC control element (MAC CE). In addition, higher-layer signaling or a higher-layer signal may include system information commonly transmitted to multiple terminals, for example, a system information block (SIB). In addition, L1 signaling may mean information transmitted to the terminal via DCI (for example, control information or scheduling information).

First Embodiment

In this embodiment, a method of dropping or stopping (or canceling) CG-PUSCH transmission (or uplink transmission configured via higher-layer signaling, for example, an SRS, a PUCCH, and a PRACH) by a terminal operating in an unlicensed band is proposed. More specifically, the base station may configure, for a terminal via high-layer signaling or L1 signaling, a resource (a slot or a symbol) for a CG-PUSCH. In addition, the base station may schedule PUSCH transmission via a UL grant (or an uplink signal for scheduling via DCI, for example, an SRS, a PUCCH, and a PRACH) immediately after a resource for the CG-PUSCH. In this case, when the terminal has not transmitted the CG-PUSCH yet, the terminal may drop the CG-PUSCH. When the terminal is already transmitting the CG-PUSCH, the terminal may stop (or cancel) the CG-PUSCH. In the following description, a method of dropping or stopping CG-PUSCH transmission by a terminal will be proposed in more detail.

1-1th Embodiment

The base station may configure, for a terminal via higher-layer signaling (or L1 signaling), a resource (or a slot or one or more symbols) for CG-PUSCH transmission. The base station may consecutively schedule via a UL grant, PUSCH transmission in a resource (or a symbol or a slot) subsequent to a CG-PUSCH resource configured for the terminal. The base station may indicate, to the terminal via a UL grant, a channel access procedure scheme (for example, a type-1 channel access procedure) to be performed by the terminal for scheduled PUSCH transmission. After the terminal performs a channel access procedure (for example, a type-1 channel access procedure) for CG-PUSCH transmission in the CG-PUSCH resource configured by the base station, the terminal may transmit a CG-PUSCH when it is determined that the corresponding band is in the idle state. In this case, the terminal may stop (or cancel) or drop transmission of one or more CG-PUSCHs included in at least one slot transmitted before a PUSCH scheduled by the base station. Further, the terminal may drop or stop transmission of one or more CG-PUSCHs transmitted before a PUSCH scheduled by the base station. The number of slots (or symbols) or CG-PUSCHs to be dropped or stopped (or cancelled) may be adjusted (or changed) according to a subcarrier spacing.

Figure 12A:
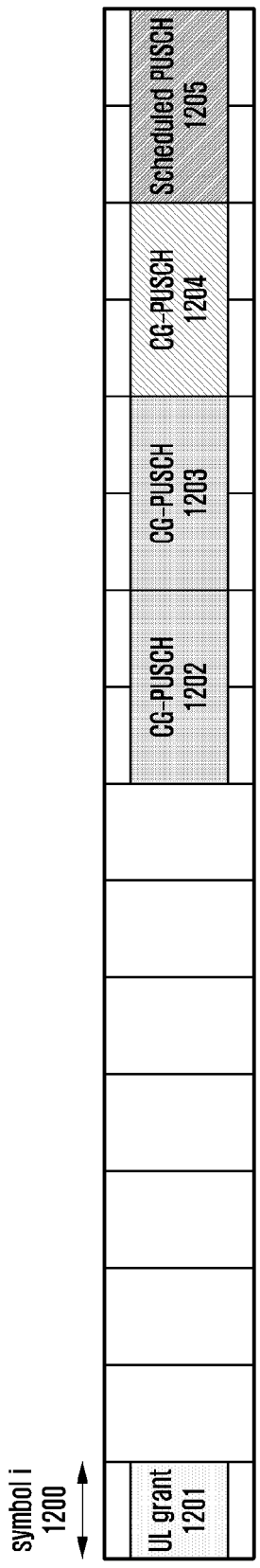
FIG. 12A illustrates an embodiment of the disclosure.

Hereinafter, description will be made with reference to FIG. 12A. The base station may configure, for a terminal via higher-layer signaling (or L1 signaling), one or more CG-PUSCH resources 1202, 1203, and 1204. The base station may consecutively schedule PUSCH 1205 transmission via a UL grant 1201 subsequent to a CG-PUSCH transmission resource 1204. In this case, after going through a channel access procedure, the terminal may perform transmission of CG-PUSCHs 1202, 1203, and 1204, wherein the terminal may drop or stop transmission of at least one CG-PUSCH 1204 preceding the PUSCH 1205, scheduled via the UL grant 1201 by the base station. In addition, the terminal may stop uplink transmission in at least one slot including the CG-PUSCH. Later, the terminal may perform a channel access procedure (or a predetermined channel access procedure) indicated by the base station for scheduled PUSCH transmission, and then perform the scheduled PUSCH transmission.

1-2th Embodiment

The base station may configure, for a terminal via higher-layer signaling (or L1 signaling), a resource (or a slot or one or more symbols) for CG-PUSCH transmission. The base station may consecutively schedule, via a UL grant, PUSCH transmission subsequent to a CG-PUSCH resource configured for the terminal. In this case, the base station may indicate, to the terminal via the UL grant, a channel access procedure scheme (for example, a type-1 channel access procedure) to be performed by the terminal for scheduled PUSCH transmission. After the terminal performs a channel access procedure (for example, a type-1 channel access procedure) for CG-PUSCH transmission in the CG-PUSCH resource configured by the base station, the terminal may transmit a CG-PUSCH when it is determined that the corresponding band is in the idle state. In this case, the terminal may drop or stop transmission of a CG-PUSCH corresponding to (or included in) [X] time (or a symbol or a slot) before a PUSCH scheduled by the base station, wherein a value of [X] may be configured by the base station via higher-layer signaling, or may be a predetermined value such as a UE capability, and may be adjusted (or changed) according to a subcarrier spacing.

Figure 12B:
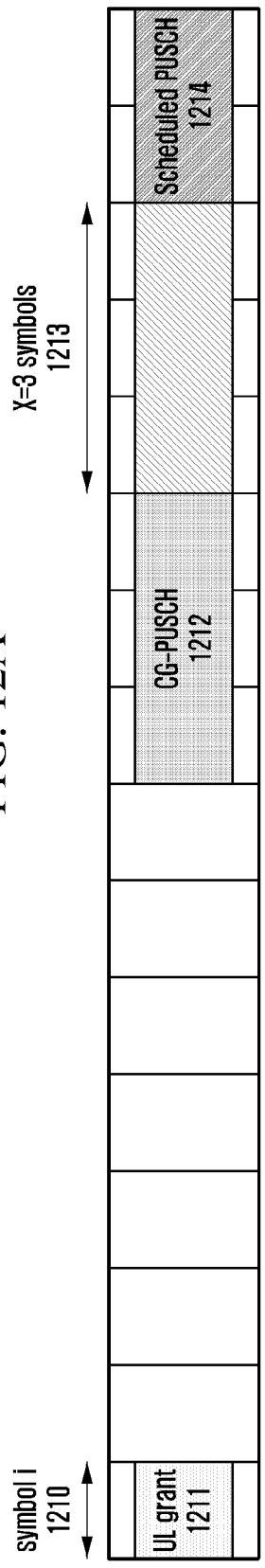
FIG. 12B illustrates an embodiment of the disclosure.

Hereinafter, description will be made with reference to FIG. 12B. The terminal may stop (or cancel or drop) a part (or the entirety) of a CG-PUSCH 1213 transmitted (or scheduled to be transmitted) for X symbols (for example, X=3) 1213 before transmission of a PUSCH 1214 scheduled via a UL grant 1211. After the terminal performs a channel access procedure (for example, a predetermined channel access procedure) indicated via the UL grant 1211, the terminal may transmit the scheduled PUSCH 1214 when it is determined that the corresponding band is in the idle state. When there is no CG-PUSCH transmitted for X symbols before transmission of the PUSCH 1214 scheduled via the UL grant 1211, the terminal may not stop or drop the CG-PUSCH. In this case, after the terminal performs a channel access procedure (or a predetermined channel access procedure) indicated via the UL grant 1211, the terminal may transmit the scheduled PUSCH 1214 when it is determined that the corresponding band is in the idle state.

1-3th Embodiment

Figure 12C:
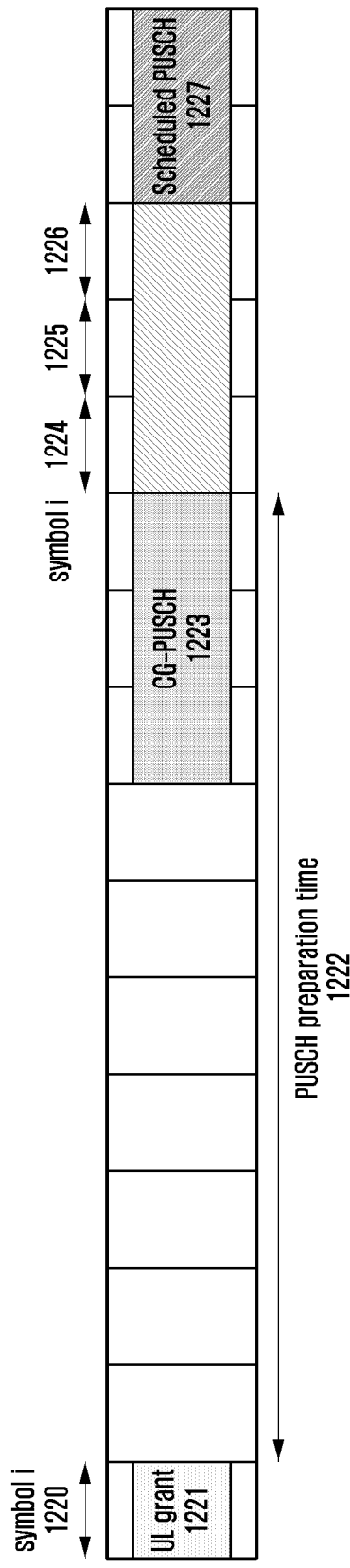
FIG. 12C illustrates an embodiment of the disclosure.

Hereinafter, the embodiment will be described with reference to FIG. 12C. The base station may configure, for a terminal via higher-layer signaling (or L1 signaling), a resource (or a slot or one or more symbols) for CG-PUSCH transmission. The base station may consecutively schedule, via a UL grant, PUSCH transmission subsequent to a CG-PUSCH resource configured for the terminal. In this case, the base station may indicate, to the terminal via the UL grant, a channel access procedure scheme (for example, a type-1 channel access procedure) to be performed by the terminal for scheduled PUSCH transmission. After the terminal performs a channel access procedure (for example, a type-1 channel access procedure) for CG-PUSCH transmission in the CG-PUSCH resource configured by the base station, the terminal may transmit a CG-PUSCH when it is determined that the corresponding band is in the idle state. In this case, the terminal may transmit a CG-PUSCH symbol 1223 starting before a predetermined time (or symbol) [Y] (for example, Tproc,2) 1222 from a time point at which the last symbol of a PDCCH including a UL grant 1221 received from the base station ends. In other words, the terminal may stop (or cancel or drop) transmission of CG-PUSCH uplink symbols 1224, 1225, and 1226 starting after a predetermined time (or symbol) [Y] (for example, Tproc,2) 1222 from a time point at which the last symbol of a PDCCH including a UL grant received from the base station ends, wherein Y may be changed (or adjusted) according to subcarrier spacings of the PUSCH and the PDCCH, the number (or location) of DMRS(s), and the like. When Tproc,2 is used, a d2,1 value may be assumed to be 0 or 1. Alternatively, the terminal may determine a CG-PUSCH to be dropped or stopped (or cancelled) in consideration of the [X] time (or symbol or slot) value described in the 1-2th embodiment above, and the length (or the number of the time) of the CG-PUSCH(s) to be stopped or dropped. In other words, when the length of the CG-PUSCH to be dropped or stopped (or cancelled), the length being determined based on a Y value, has a value larger than an X value, the terminal may determine, based on the X value, a symbol of the CG-PUSCH to be stopped (or cancelled) or dropped. For example, the number of symbols (or slots) of the CG-PUSCH to be transmitted after a predetermined time (that is, after time Y) from the UL grant received by the base station is 10, and X=4, the terminal may not drop or stop (or cancel) all 10 symbols (or slots) among CG-PUSCHs transmitted before the PUSCH scheduled via the UL grant, and may stop or drop at least four symbols only and transmit the scheduled PUSCH. In this case, after the terminal performs a channel access procedure (or predetermined channel access procedure) indicated by the base station of scheduled PUSCH transmission, the terminal may perform the scheduled PUSCH transmission when it is determined that the corresponding band is in the idle state.

Second Embodiment

In the disclosure, a method of transmitting a PUSCH scheduled by the base station, by a terminal operating in an unlicensed band is proposed. More specifically, the base station may configure, for a terminal via high-layer signaling (or L1 signaling), a resource (a symbol or a slot) for a CG-PUSCH. In addition, the base station may schedule, for the terminal via a UL grant, PUSCH transmission in a resource (or a symbol or a slot) immediately after a resource for the CG-PUSCH configured via higher-layer signaling. In this case, when the terminal is to transmit the scheduled PUSCH, the terminal may transmit the scheduled PUSCH without performing a channel access procedure (or after performing a fixed time channel access procedure) after the CG-PUSCH transmission. In the following description, a method of determining scheduled PUSCH transmission by a terminal without performing a channel access procedure will be proposed in more detail.

2-1th Embodiment

The base station may configure, for a terminal via higher-layer signaling (or L1 signaling), a resource (or a slot or one or more symbols) for CG-PUSCH transmission. The base station may consecutively schedule, via a UL grant, PUSCH transmission subsequent to a CG-PUSCH resource configured for the terminal. In this case, the base station may indicate, to the terminal via a UL grant, a channel access procedure scheme (for example, a type-1 channel access procedure) to be performed by the terminal for scheduled PUSCH transmission. When the base station schedules, for a terminal via a UL grant, a PUSCH with respect to all RBs capable of allowing the terminal to transmit the PUSCH, the terminal may transmit the scheduled PUSCH without performing a channel access procedure (or after performing a channel access procedure for a fixed time) after CG-PUSCH transmission, regardless of the channel access procedure indicated by the base station. In the following description, a method of determining, by a terminal, that all RBs transmittable a base station are scheduled will be described in detail.

[Method 1]

When an FDRA field included in DCI for scheduling a PUSCH indicates a particular field, the terminal may determine that a PUSCH scheduled without performing a channel access procedure after CG-PUSCH transmission can be transmitted. In this case, the particular field may be changed according an FDRA type and a subcarrier spacing. For example, the terminal which is configured or indicated by the base station with FDRA type 2 and subcarrier spacing 30 kHz may transmit the PUSCH without performing the channel access procedure when all FDRA fields are configured as "1". In another example, the terminal which is configured or indicated by the base station with FDRA type 2 and subcarrier spacing 15 kHz may transmit the PUSCH without performing the channel access procedure when the FDRA field indicates a particular value (for example, 19) or a particular field.

[Method 2]

When an FDRA field of DCI (for example, DCI format 0_1) for scheduling a PUSCH includes Y bits which indicate the number of RB sets in a BWP and X bits which mean interlace allocation, the terminal may determine that a PUSCH can be transmitted without performing a channel access procedure after CG-PUSCH transmission when the FDRA field indicates a particular value. In this case, a Y bit may be the least significant bit (or the most significant bit) of the FDRA field. More specifically, if at least one RB set for transmitting a PUSCH scheduled via the UL grant is identical to an RB set for transmitting a CG-PUSCH (or when Y bits indicating an RB set identical to an RB set for transmitting a CG-PUSCH via an FDRA field are received) and the UL grant indicates uplink transmission in all RBs in one or more RB sets, the terminal may transmit a PUSCH without performing a channel access procedure after CG-PUSCH transmission. If not, the terminal may drop or stop (or cancel) a CG-PUSCH and a scheme thereof may follow a method in the above-described embodiment.

[Method 3]

When an FDRA field of DCI (for example, DCI format 0_1) for scheduling a PUSCH includes Y bits which indicate the number of RB sets in a BWP and X bits which mean interlace allocation, the terminal may determine that a PUSCH can be transmitted without performing a channel access procedure after CG-PUSCH transmission when the FDRA field indicates a particular value. More specifically, if at least one RB set for transmitting a PUSCH scheduled via the UL grant is a part of at least one RB set for transmitting a CG-PUSCH (or when Y bits indicating an RB set identical to a part of an RB set for transmitting a CG-PUSCH via an FDRA field are received) and the UL grant indicates uplink transmission in all RBs in one or more RB sets, the terminal may transmit a PUSCH without performing a channel access procedure after CG-PUSCH transmission. If not, the terminal may drop or stop (or cancel) a CG-PUSCH. For example, when the Y bit indicates an RB set other than the at least one RB set for transmitting a CG-PUSCH, the terminal may drop or stop (or cancel) a CG-PUSCH by using the method in the above-described embodiment. In this case, after the terminal performs a channel access procedure (or a predetermined channel access procedure type) indicated by the base station for scheduled PUSCH transmission, the terminal may perform the scheduled PUSCH transmission when it is determined that the corresponding band is in the idle state.

[Method 4]

When an FDRA field of DCI (for example, DCI format 0_1) for scheduling a PUSCH includes Y bits which indicate the number of RB sets in a BWP and X bits which mean interlace allocation, the terminal may determine that a PUSCH can be transmitted without performing a channel access procedure after CG-PUSCH transmission when the FDRA field indicates a particular value. More specifically, if at least one RB set for transmitting a PUSCH scheduled via the UL grant is a part of at least one RB set for transmitting a CG-PUSCH (or when Y bits indicating at least one RB set identical to a part of an RB set for transmitting a CG-PUSCH via an FDRA field are received) and the UL grant indicates uplink transmission in all RBs in one or more RB sets, the terminal may transmit a PUSCH without performing a channel access procedure after CG-PUSCH transmission. If not, the terminal may drop or stop (or cancel) a CG-PUSCH. In this case, after the terminal performs a channel access procedure indicated by the base station for scheduled PUSCH transmission, the terminal may perform the scheduled PUSCH transmission when it is determined that the corresponding band is in the idle state.

2-2th Embodiment

The base station may configure, for a terminal via higher-layer signaling (or L1 signaling), a resource (or a slot or one or more symbols) for CG-PUSCH transmission. The base station may consecutively schedule, via a UL grant, PUSCH transmission from a resource (or a symbol or a slot) subsequent to a CG-PUSCH resource configured for the terminal. In this case, the base station may indicate, via a UL grant, a channel access procedure scheme (for example, a type-1 channel access procedure) to be performed by the terminal for scheduled PUSCH transmission. The terminal may perform a channel access procedure for CG-PUSCH transmission. In this case, when a channel access priority value applied by the terminal in a channel access procedure for CG-PUSCH transmission is equal to or larger than a channel access priority value indicated by the UL grant, and a PUSCH for performing scheduling via the UL grant is scheduled within an MCOT acquired when the terminal transmits a CG-PUSCH, the terminal may transmit a scheduled PUSCH without performing a channel access procedure (or performing a fixed time channel access procedure).

2-3th Embodiment

Figure 13:
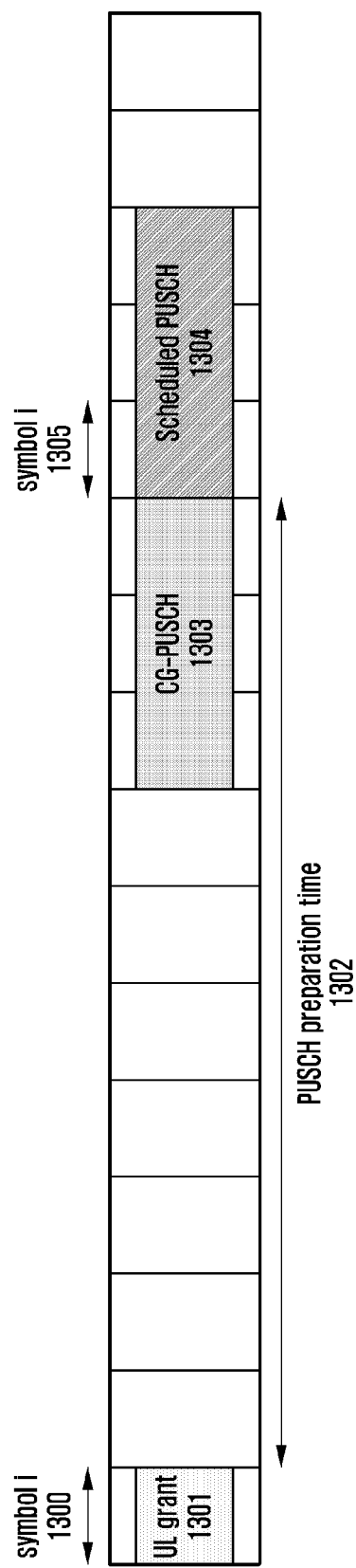
FIG. 13 illustrates an embodiment of the disclosure.

Hereinafter, description will be made with reference to FIG. 13. The base station may configure, for a terminal via higher-layer (or L1) signaling, a resource (or a slot or one or more symbols) for CG-PUSCH transmission. The base station may consecutively schedule, via a UL grant, PUSCH transmission from a resource (or a symbol or a slot) subsequent to a CG-PUSCH resource configured for the terminal. In this case, the base station may indicate, via a UL grant, a channel access procedure scheme (for example, a type-1 channel access procedure) to be performed by the terminal for scheduled PUSCH transmission. Meanwhile, when a start symbol 1305 of a PUSCH 1304 scheduled via a UL grant is the first symbol 1305 after a predetermined time (or symbol) [Y] (for example, Tproc,2) 1302 from a time point at which the last symbol 1300 of a PDCCH including a UL grant 1301 received from the base station ends, the terminal may transmit the PUSCH 1304 without performing a channel access procedure (or after performing the channel access procedure for a fixed time) after CG-PUSCH 1303 transmission regardless of the channel access procedure indicated by the base station. Alternatively, when an interval between the start symbol 1305 of the PUSCH scheduled for the terminal via the UL grant and the first symbol after a predetermined time [Y] (for example, Tproc,2) 1302 from a time point at which the last symbol of the PDCCH including the UL grant received from the base station ends is Z time (or the length of the symbol) or less, the terminal may transmit the scheduled PUSCH without performing a channel access procedure after CG-PUSCH transmission (or after performing a channel access procedure for a fixed time) regardless of the channel access procedure indicated by the base station, wherein Z may be changed (or adjusted) according to a subcarrier spacing, and may be configured by the base station via higher-layer signaling or may be a preconfigured value such as a UE capability.

Third Embodiment

In the disclosure, a method of transmitting an uplink (for example, a PUSCH, a PUCCH, a PRACH, and an SRS) scheduled by the base station, by a terminal operating in an unlicensed band is proposed. More specifically, the base station may configure, for a terminal via higher-layer (or L1) signaling, a resource (or a symbol or a slot) for a CG-PUSCH (or an uplink signal configured via higher-layer signaling, for example, an SRS, a PRACH, or a PUCCH). In addition, the base station may schedule, for a resource (or a symbol or a slot) immediately subsequent to a resource for CG-PUSCH transmission configured for the terminal via higher-layer signaling, PUSCH transmission (or transmission of an uplink signal via DCI, for example, a PUCCH, a PRACH, and an SRS) via a UL grant. In this case, in consideration of priorities of an uplink signal configured via higher-layer signaling and an uplink signal scheduled via DCI, the terminal may determine, transmission of the signal configured via higher-layer signaling and the signal scheduled via DCI.

[Method 1]

The terminal may determine that a signal scheduled via DCI has a priority higher than that of an uplink signal configured by the base station via higher-layer signaling. Alternatively, when the uplink signal (or channel) configured via higher-layer signaling is identical to a signal (or channel) scheduled via DCI, the terminal may determine that the uplink signal scheduled via DCI has a higher priority. In this case, the terminal may drop or stop the uplink signal configured via higher-layer signaling according to a combination of the above-described embodiments. After the terminal performs a channel access procedure (or a preconfigured or predetermined channel access procedure type) indicated by the base station via DCI, the terminal may transmit the uplink signal scheduled via DCI when it is determined that the corresponding band is in the idle state.

[Method 2]

When an uplink signal indicated via DCI is transmitted from the base station via a particular channel (or signal), the terminal may drop or stop an uplink signal configured via higher-layer signaling. For example, when the uplink signal indicated via DCI is a PUSCH, the terminal may drop or stop the uplink signal configured via higher-layer signaling. In another example, when the uplink signal indicated via DCI is a PUCCH, the terminal may drop or stop the uplink signal configured via higher-layer signaling. In another example, when the uplink signal indicated via DCI is a PRACH, the terminal may drop or stop the uplink signal configured via higher-layer signaling. After the terminal performs a channel access procedure indicated by the base station via DCI, the terminal may transmit the uplink signal scheduled via DCI when it is determined that the corresponding band is in the idle state.

[Method 3]

When an uplink signal configured via higher-layer signaling is transmitted via a particular channel (or a particular signal), the terminal may not drop or stop the corresponding uplink signal. For example, when the signal configured via higher-layer signaling is a PRACH, the terminal may not stop or drop the PRACH transmission configured via higher-layer signaling. In this case, the terminal may drop the uplink transmission scheduled via DCI or may perform transmission without performing a channel access procedure.

[Method 4]

When an uplink signal configured via higher-layer signaling is a signal transmitted via a particular channel, the terminal may not drop or stop the corresponding uplink signal. For example, when the signal configured via higher-layer signaling is a PUCCH, the terminal may not stop or drop PUCCH transmission configured via higher-layer signaling. In this case, the PUCCH may mean a PUCCH including only an SR and/or HAR-ACK.

[Method 5]

When an uplink signal scheduled by the base station via DCI is a signal transmitted via a particular channel (or signal), the terminal may not stop or drop signal transmission configured via higher-layer signaling. For example, when SRS transmission is scheduled for the terminal by the base station via DCI, the terminal may not stop or drop the uplink signal transmission indicated via higher-layer signaling. In this case, the terminal may drop SRS transmission scheduled via DCI, or may perform transmission without performing a channel access procedure.

Meanwhile, each embodiment and scheme may be combined and managed as necessary. For example, some methods proposed in the disclosure may be combined, and the base station and the terminal may be managed according thereto.

Figure 14:
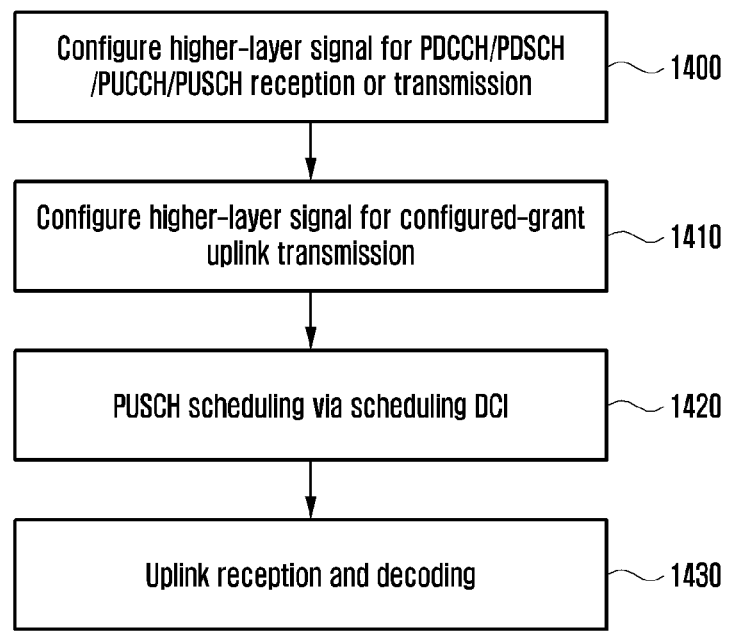
FIG. 14 is a flow chart illustrating an operation of a base station according to an embodiment of the disclosure.

FIG. 14 is a flow chart illustrating an operation of a base station according to an embodiment of the disclosure.

The operation of the base station according to an embodiment of the disclosure is described below with reference to FIG. 14.

In operation 1400, the base station may transmit, to the terminal via a higher-layer signal, a configuration on PDCCH, PDSCH, PUCCH, and PUSCH transmission or reception. For example, the base station may transmit, to the terminal via a higher-layer signal, a configuration on a PDCCH resource area or a CORSET in which the terminal receives downlink or uplink scheduling information, and the like. In addition, the base station may include information on an offset between a PDCCH reception slot and a PDSCH reception slot or an offset between a PDCCH reception slot and a PUSCH transmission slot, information on the number of times of PDSCH or PUSCH repetitive transmission, and the like, and may transmit the configuration on PDSCH/PUSCH transmission or reception to the terminal via a higher-layer signal. The base station may transmit, to the terminal via a higher layer signal, configuration information indicating whether to schedule a multi-PUSCH by using one piece of UCI, interlace structure configuration information, and configuration information relating to subcarrier spacing information used for downlink reception or uplink transmission. In operation 1410, the base station may transmit configured-grant-related configuration information such as a configured-grant transport interval, offset information, and the like. In addition, the base station may transmit one or more pieces of configured-grant-related configuration information. The base station may transmit information relating to a configuration of a gap between a CG-PUSCH and a scheduled PUSCH. In this case, the configured grant configuration information transmitted to the terminal in operation 1410 can also be transmitted in operation 1400. In operation 1420, the base station may indicate information on PUSCH scheduling to the terminal by using downlink control information. In operation 1430, the base station may receive or decode a CG-PUSCH transmitted by the terminal or uplink control information included in the CG-PUSCH by using information configured for the terminal by the base station.

Figure 15:
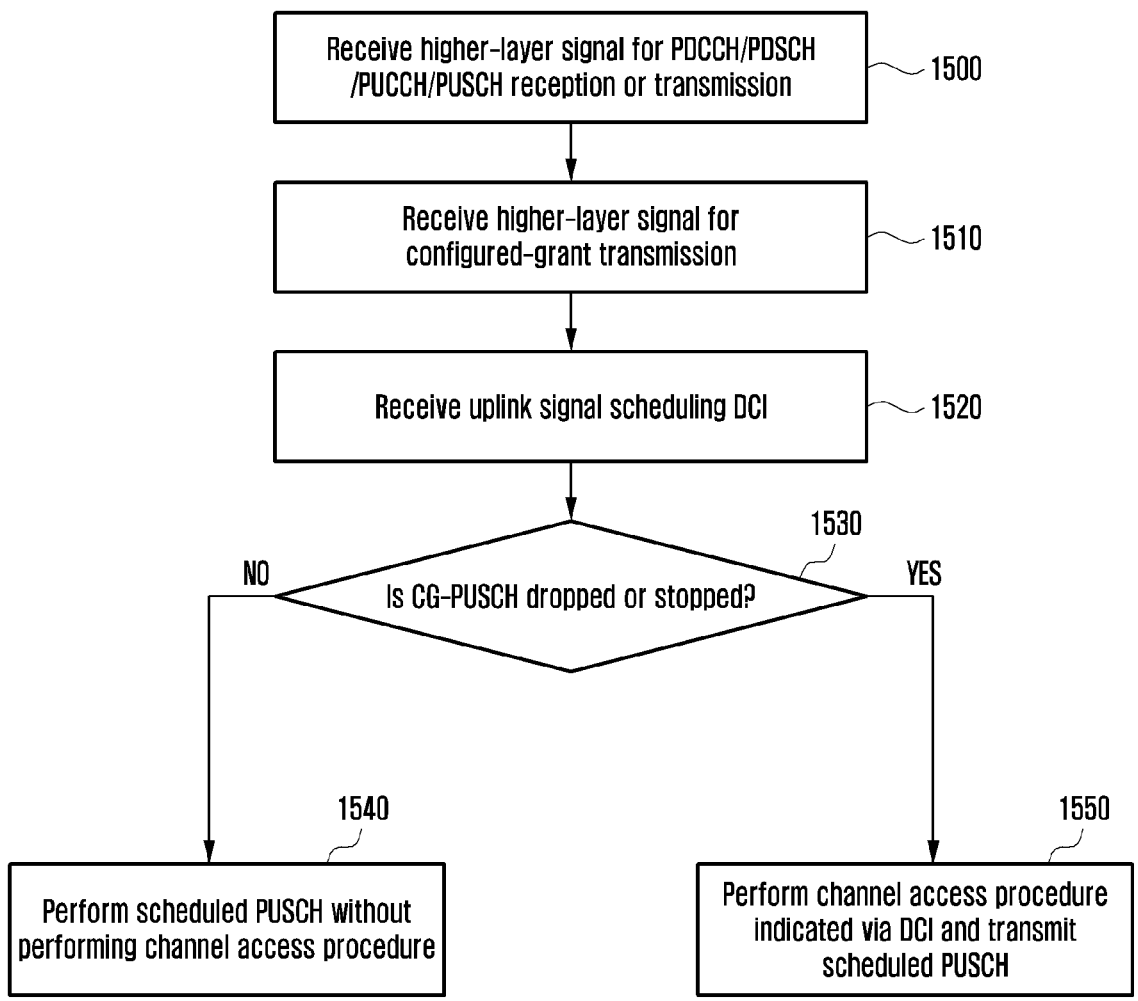
FIG. 15 is a flow chart illustrating an operation of a terminal according to an embodiment of the disclosure.

FIG. 15 is a flow chart illustrating an operation of a terminal according to an embodiment of the disclosure.

The operation of the base station according to an embodiment of the disclosure is described below with reference to FIG. 15.

In operation 1500, the terminal receives, from the base station via a higher-layer signal, a configuration on PDCCH, PDSCH, PUCCH, and PUSCH transmission or reception, and configures the PDCCH, PDSCH, PUCCH, and PUSCH transmission or reception according to the received configuration information. For example, the terminal may receive, from the base station via a higher-layer signal, a configuration on a PDCCH resource area or a CORSET in which the terminal receives downlink or uplink scheduling information, a search space configuration, and the like. The terminal may receive, from the base station via a higher layer signal, configuration information indicating whether to schedule a multi-PUSCH by using one piece of UCI, interlace structure configuration information, configuration information relating to subcarrier spacing information used for downlink reception or uplink transmission. In operation 1510, the terminal may receive configured-grant-related configuration information such as a configured-grant transport interval, offset information, and the like. In addition, the terminal may receive one or more pieces of configured-grant-related information. The terminal may be configured by the base station with information related to a gap between a CG-PUSCH and a scheduled PUSCH. In this case, the configured-grant-related configuration information in operation 1510 can also be included in the higher-layer signal configuration information transmitted in operation 1500. In operation 1520, the terminal may receive, from the base station, downlink control information including information for scheduling PUSCH transmission. When it is determined in operation 1530 that a CG-PUSCH before a PUSCH scheduled by the DCI according to the above-mentioned embodiment is not to be dropped or stopped, the terminal may transmit the PUSCH without performing a channel access procedure in operation 1540. When it is determined in operation 1530 that a CG-PUSCH before a PUSCH scheduled by the DCI according to the above-mentioned embodiment is to be dropped or stopped, the terminal may perform the channel access procedure indicated by the base station, and then transmit the scheduled PUSCH in a case where it is determined that the corresponding band is in the idle state.

Figure 16:
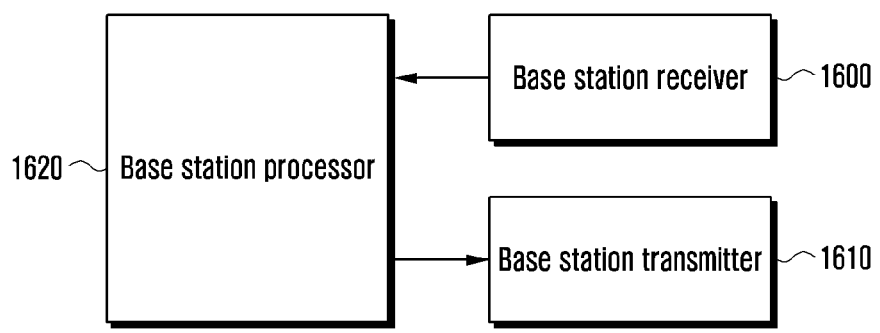
FIG. 16 is a block diagram illustrating a structure of a base station according to an embodiment of the disclosure.

FIG. 16 is a block diagram illustrating a structure of a base station according to an embodiment of the disclosure.

As illustrated in FIG. 16, the base station of the disclosure may include a base station receiver 1600, a base station transmitter 1610, and a base station processor 1620. The base station receiver 1600 and the base station transmitter 1610 may be collectively called a "transceiver" in an embodiment of the disclosure. The transceiver may transmit or receive a signal to or from the terminal. The signal may include control information and data. To this end, the transceiver may include a radio frequency (RF) transmitter configured to up-convert and amplify a frequency of a signal to be transmitted, and an RF receiver configured to low-noise amplify a received signal and down-convert a frequency. In addition, the transceiver may receive a signal via a wireless channel, may output the signal to the base station processor 1620, and may transmit, via the wireless channel, a signal output from the base station processor 1620. The base station processor 1620 may control a series of processes to make the base station operate according to the above-described embodiment of the disclosure. For example, the base station processor 1620 may perform a channel access procedure with respect to an unlicensed band. For a more detailed example, the base station receiver 1600 may receive signals transmitted via the unlicensed band, and the base station processor 1620 may determine whether the unlicensed band is in an idle state by comparing a strength of each of the received signals with a threshold value that is pre-defined or is determined as a result value of a function using a bandwidth as a factor. In this case, the base station processor 1620 may perform a channel access procedure for each direction (or beam).

Figure 17:
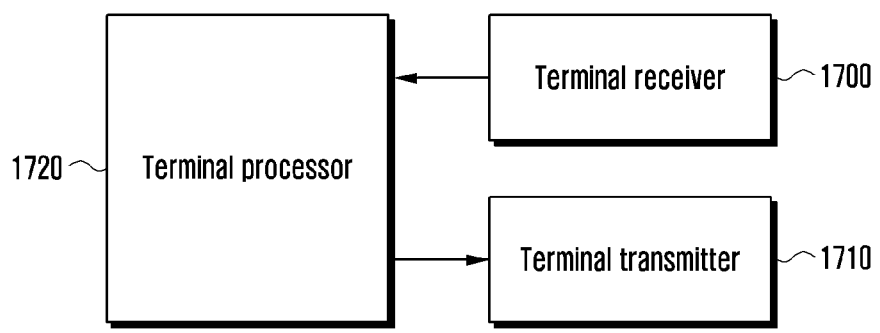
FIG. 17 is a block diagram illustrating a structure of a terminal according to an embodiment of the disclosure.

FIG. 17 is a block diagram illustrating a structure of a terminal according to an embodiment of the disclosure.

As illustrated in FIG. 17, the terminal of the disclosure may include a terminal receiver 1700, a terminal transmitter 1710, and a terminal processor 1720. The terminal receiver 1700 and the terminal transmitter 1710 may be collectively called a "transceiver" in an embodiment of the disclosure. The transceiver may transmit or receive a signal to or from the base station. The signal may include control information and data. To this end, the transceiver may include a radio frequency (RF) transmitter configured to up-convert and amplify a frequency of a signal to be transmitted, and an RF receiver configured to low-noise amplify a received signal and down-convert a frequency. In addition, the transceiver may receive a signal via a wireless channel, may output the signal to the terminal processor 1720, and may transmit, via the wireless channel, a signal output from the terminal processor 1720. The terminal processor 1720 may control a series of processes to make the terminal operate according to the above-described embodiment of the disclosure. For example, the terminal receiver 1700 may receive a data signal including a control signal, and the terminal processor 1720 may determine, based on a reception result of the control signal, uplink signal transmission and a channel access procedure scheme. Later, the terminal transmitter 1710 may transmit an uplink data signal to the base station.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
receiving, from a base station, configuration information indicating a resource for a configured grant uplink (UL) transmission in a shared spectrum channel;
receiving, from the base station, downlink control information indicating a resource for a scheduled UL transmission in the shared spectrum channel, wherein the resource for the configured grant UL transmission is before the resource for the scheduled UL transmission in time domain,
dropping configured grant UL transmission according to a priority of a channel access procedure for the configured grant UL transmission and a priority of a channel access procedure for the scheduled UL transmission; and
transmitting, to the base station, the scheduled UL transmission based on the downlink control information.

2. The method of claim 1, wherein the configured grant UL transmission is the last configured grant UL transmission among one or more configured grant UL transmissions configured before the scheduled UL transmission.

3. The method of claim 1, wherein the configured grant UL transmission starts after a time duration from a symbol associated with the downlink control information.

4. The method of claim 1, wherein, in case that the scheduled UL transmission occupies all resource blocks (RBs) of the configured grant UL transmission or all RBs of a subset of the configured grant UL transmission, and the priority of the channel access procedure for the configured grant UL transmission is larger than or equal to the priority of the channel access procedure for the scheduled UL transmission, the configured grant UL transmission is not dropped and the scheduled UL transmission is transmitted after configured grant UL transmission without a gap.

5. The method of claim 4, wherein a sum of transmission durations of the configured grant UL transmission and the scheduled UL transmission is within a maximum channel occupancy time (MCOT).

6. A method performed by a base station in a communication system, the method comprising:
transmitting, to a terminal, configuration information indicating a resource for a configured grant uplink (UL) transmission in a shared spectrum channel;
transmitting, to the terminal, downlink control information indicating a resource for a scheduled UL transmission in the shared spectrum channel, wherein the resource for the configured grant UL transmission is before the resource for the scheduled UL transmission in time domain; and
receiving, from the terminal, the scheduled UL transmission based on the downlink control information without the configured grant UL transmission, according to a priority of a channel access procedure for the configured grant UL transmission and a priority of a channel access procedure for the scheduled UL transmission.

7. The method of claim 6, wherein the configured grant UL transmission is the last configured grant UL transmission among one or more configured grant UL transmissions configured before the scheduled UL transmission.

8. The method of claim 6, wherein the configured grant UL transmission starts after a time duration from a symbol associated with the downlink control information is dropped.

9. The method of claim 6, wherein, in case that the scheduled UL transmission occupies all resource blocks (RBs) of the configured grant UL transmission or all RBs of a subset of the configured grant UL transmission, and the priority of the channel access procedure for the configured grant UL transmission is larger than or equal to the priority of the channel access procedure for the scheduled UL transmission, the scheduled UL transmission is received after the configured grant UL transmission without a gap.

10. The method of claim 9, wherein a sum of transmission durations of the configured grant UL transmission and the scheduled UL transmission is within a maximum channel occupancy time (MCOT).

11. A terminal in a communication system, the terminal comprising:
   a transceiver; and
   a controller configured to:
      receive, from a base station, configuration information indicating a resource for a configured grant uplink (UL) transmission in a shared spectrum channel,
      receive, from the base station, downlink control information indicating a resource for scheduled UL transmission in the shared spectrum channel, wherein the resource for the configured grant UL transmission is before the resource for the scheduled UL transmission in time domain,
      drop configured grant UL transmission according to a priority of a channel access procedure for the configured grant UL transmission and a priority of a channel access procedure for the scheduled UL transmission; and
      transmit, to the base station, the scheduled UL transmission based on the downlink control information.

12. The terminal of claim 11, wherein the configured grant UL transmission is the last configured grant UL transmission among one or more configured grant UL transmissions configured before the scheduled UL transmission.

13. The terminal of claim 11, wherein the configured grant UL transmission starts after a time duration from a symbol associated with the downlink control information.

14. The terminal of claim 11, wherein, in case that the scheduled UL transmission occupies all resource blocks (RBs) of the configured grant UL transmission or all RBs of a subset of the configured grant UL transmission, and the priority of the channel access procedure for the configured grant UL transmission is larger than or equal to the priority of the channel access procedure for the scheduled UL transmission, the configured grant UL transmission is not dropped and the scheduled UL transmission is transmitted after the configured grant UL transmission without a gap.

15. The terminal of claim 14, wherein a sum of transmission durations of the configured grant UL transmission and the scheduled UL transmission is within a maximum channel occupancy time (MCOT).

16. A base station in a communication system, the base station comprising:
   a transceiver; and
   a controller configured to:
      transmit, to a terminal, configuration information indicating a resource for a configured grant uplink (UL) transmission in a shared spectrum channel,
      transmit, to the terminal, downlink control information indicating a resource for a scheduled UL transmission in the shared spectrum channel, wherein the resource for the configured grant UL transmission is before the resource for the scheduled UL transmission in time domain, and
      receive, from the terminal, the scheduled UL transmission based on the downlink control information without the configured grant UL transmission, according to a priority of a channel access procedure for the configured grant UL transmission and a priority of a channel access procedure for the scheduled UL transmission.

17. The base station of claim 16, wherein the configured grant UL transmission is the last configured grant UL transmission among one or more configured grant UL transmissions configured before the scheduled UL transmission.

18. The base station of claim 16, wherein the configured grant UL transmission starts after a time duration from a symbol associated with the downlink control information.

19. The base station of claim 16, wherein, in case that the scheduled UL transmission occupies all resource blocks (RBs) of the configured grant UL transmission or all RBs of a subset of the configured grant UL transmission, and the priority of the channel access procedure for the configured grant UL transmission is larger than or equal to the priority of the channel access procedure for the scheduled UL transmission, the scheduled UL transmission is received after the configured grant UL transmission without a gap.

20. The base station of claim 19, wherein a sum of transmission durations of the configured grant UL transmission and the scheduled UL transmission is within a maximum channel occupancy time (MCOT).

* * * * *